United States Patent
Meier et al.

(10) Patent No.: US 10,901,394 B2
(45) Date of Patent: Jan. 26, 2021

(54) MANUFACTURING PROCESS DATA COLLECTION AND ANALYTICS

(71) Applicant: SAP SE, Walldorf (DE)

(72) Inventors: Stephan Meier, Danville, CA (US); Philipp Raub, Heidelberg (DE); Robert Noce, Maple (CA); Matthias Weigold, Heidelberg (DE); Navdeep Raj Ganesh, San Francisco, CA (US); Sarah Fathallah, San Francisco, CA (US); Sarah Nolan, Dublin (IE)

(73) Assignee: SAP SE, Walldorf (DE)

( * ) Notice: Subject to any disclaimer, the term of this patent is extended or adjusted under 35 U.S.C. 154(b) by 522 days.

(21) Appl. No.: 15/495,713

(22) Filed: Apr. 24, 2017

(65) Prior Publication Data

US 2018/0246502 A1 Aug. 30, 2018

Related U.S. Application Data

(60) Provisional application No. 62/466,821, filed on Mar. 3, 2017, provisional application No. 62/464,543, filed on Feb. 28, 2017.

(51) Int. Cl.
*G05B 19/4099* (2006.01)
*G05B 19/418* (2006.01)
(Continued)

(52) U.S. Cl.
CPC ......... *G05B 19/4099* (2013.01); *G05B 19/18* (2013.01); *G05B 19/4093* (2013.01);
(Continued)

(58) Field of Classification Search
CPC ................ G05B 19/4099; G05B 19/18; G05B 19/4093; G05B 19/41875;
(Continued)

(56) References Cited

U.S. PATENT DOCUMENTS 6,112,133 A * 8/2000 Fishman .......... G05B 19/40937
700/180
6,766,407 B1 7/2004 Lisitsa et al.
(Continued)

FOREIGN PATENT DOCUMENTS

AU 2002310479 1/2009
EP 2538288 12/2012
(Continued)

OTHER PUBLICATIONS

Jack Wallen, "How to use the new Google Explore Feature"; TechReplublic; Oct. 17, 2016; 8 pages; <http://www.techrepublic.com/article/how-to-use-the-new-google-explore-feature/>.
(Continued)

*Primary Examiner* — Robert E Fennema
*Assistant Examiner* — Christopher W Carter
(74) *Attorney, Agent, or Firm* — Fish & Richardson P.C.

(57) ABSTRACT

Techniques are described for viewing a plurality of related presentation areas linked to a set of machine-related data. In one example, a machine-related data set associated with a manufacturing process session for manufacturing a particular workpiece is presented, the data set representing a common data set presented in a plurality of presentation areas, each associated with a separate view on the machine-related data set. In one of the presentation areas, a selection of a particular group of data points is identified and that presentation area is updated. Reference values associated with the common data set are identified based on the selected group of data points. For each of the other presentation areas, (1) a particular set of data included in the particular other presentation area corresponding to the identified reference values is identified and (2) the corresponding presentation area is updated based on that identified data set.

19 Claims, 20 Drawing Sheets

(51) Int. Cl.

| | |
|---|---|
| *G06T 19/00* | (2011.01) |
| *G06F 3/147* | (2006.01) |
| *G05B 19/4093* | (2006.01) |
| *G05B 19/18* | (2006.01) |
| *G06F 3/14* | (2006.01) |
| *G06Q 10/06* | (2012.01) |
| *G06T 15/00* | (2011.01) |

(52) U.S. Cl.
CPC . *G05B 19/41875* (2013.01); *G05B 19/41885* (2013.01); *G06F 3/147* (2013.01); *G06F 3/1454* (2013.01); *G06Q 10/06* (2013.01); *G06T 15/005* (2013.01); *G06T 19/00* (2013.01); *G05B 2219/32128* (2013.01); *G05B 2219/40502* (2013.01); *G05B 2219/42155* (2013.01); *G05B 2219/4717* (2013.01); *G06T 2200/24* (2013.01)

(58) Field of Classification Search
CPC .... G05B 19/41885; G05B 2219/32128; G05B 2219/40502; G05B 2219/42155; G05B 2219/4717; G06F 3/1454; G06F 3/147; G06F 10/06; G06T 15/005; G06T 19/00; G06T 2200/24
USPC ........................................................ 700/109
See application file for complete search history.

(56) References Cited

U.S. PATENT DOCUMENTS

| | | | |
|---|---|---|---|
| 7,672,814 | B1 | 3/2010 | Raanan et al. |
| 8,990,184 | B2 | 3/2015 | Baum et al. |
| 9,491,437 | B2 | 11/2016 | Park et al. |
| 9,563,605 | B1 | 2/2017 | Bergquist et al. |
| 9,652,139 | B1 | 5/2017 | Shankar et al. |
| 10,379,523 | B2 * | 8/2019 | Kikata ............... G05B 19/4068 |
| 2001/0008574 | A1 | 7/2001 | Miyashita et al. |
| 2002/0002414 | A1 | 1/2002 | Hsiung et al. |
| 2002/0129007 | A1 | 9/2002 | Kobayashi et al. |
| 2002/0198679 | A1 | 12/2002 | Victor et al. |
| 2003/0125854 | A1 | 7/2003 | Kawasaki et al. |
| 2003/0171841 | A1 | 9/2003 | Porter |
| 2005/0038538 | A1 | 2/2005 | McDonald et al. |
| 2005/0060741 | A1 | 3/2005 | Tsutsui |
| 2005/0066285 | A1 | 3/2005 | Santori et al. |
| 2005/0159911 | A1 | 7/2005 | Funk et al. |
| 2005/0197805 | A1 | 9/2005 | Eryurek et al. |
| 2005/0197806 | A1 | 9/2005 | Eryurek et al. |
| 2006/0010006 | A1 | 1/2006 | Kreidler et al. |
| 2006/0031187 | A1 | 2/2006 | Pyrce |
| 2006/0206860 | A1 | 9/2006 | Dardinski et al. |
| 2007/0280279 | A1 | 12/2007 | Mituhasi et al. |
| 2008/0207140 | A1 | 8/2008 | Rofougaran |
| 2008/0267504 | A1 | 10/2008 | Schloter et al. |
| 2008/0306766 | A1 | 12/2008 | Ozeki et al. |
| 2008/0313228 | A1 | 12/2008 | Clark et al. |
| 2009/0177738 | A1 | 7/2009 | Okada |
| 2009/0259961 | A1 | 10/2009 | Bakli et al. |
| 2009/0326680 | A1 | 12/2009 | Landgraf |
| 2010/0023151 | A1 | 1/2010 | Shieh et al. |
| 2010/0256794 | A1 | 10/2010 | McLaughlin et al. |
| 2010/0257228 | A1 | 10/2010 | Staggs et al. |
| 2011/0067062 | A1 | 3/2011 | Karaoguz et al. |
| 2011/0301739 | A1 | 12/2011 | Kataoka et al. |
| 2012/0033035 | A1 | 2/2012 | Lee et al. |
| 2012/0123579 | A1 | 5/2012 | Kubli |
| 2012/0330452 | A1 | 12/2012 | Guenther et al. |
| 2012/0331352 | A1 | 12/2012 | Guenther et al. |
| 2013/0030555 | A1 | 1/2013 | Starr et al. |
| 2013/0110263 | A1 | 5/2013 | Schulze et al. |
| 2013/0124465 | A1 | 5/2013 | Pingel |
| 2013/0166569 | A1 | 6/2013 | Navas |
| 2013/0342648 | A1 | 12/2013 | Yim et al. |
| 2014/0039805 | A1 | 2/2014 | Sharpe, Jr. et al. |
| 2014/0212978 | A1 | 7/2014 | Sharpe, Jr. et al. |
| 2015/0134313 | A1 | 5/2015 | Maturana et al. |
| 2015/0186483 | A1 | 7/2015 | Tappan et al. |
| 2015/0213631 | A1 | 7/2015 | Broek |
| 2015/0286212 | A1 | 10/2015 | Gobalakrishnan et al. |
| 2015/0363251 | A1 | 12/2015 | Wang |
| 2016/0058406 | A1 | 3/2016 | Lee et al. |
| 2016/0124424 | A1 | 5/2016 | Strong |
| 2016/0239009 | A1 | 8/2016 | Mizuno |
| 2016/0275133 | A1 | 9/2016 | Moore |
| 2016/0370165 | A1 | 12/2016 | Kelley et al. |
| 2017/0308805 | A1 | 10/2017 | Altamirano |
| 2017/0315541 | A1 | 11/2017 | Kreidler et al. |
| 2017/0337226 | A1 | 11/2017 | Bliss |
| 2018/0246495 | A1 | 8/2018 | Meier et al. |
| 2018/0246496 | A1 | 8/2018 | Meier et al. |
| 2018/0246497 | A1 | 8/2018 | Wolf et al. |
| 2019/0141000 | A1 | 5/2019 | Berner et al. |
| 2020/0029123 | A1 | 1/2020 | Oh et al. |

FOREIGN PATENT DOCUMENTS

| | | | |
|---|---|---|---|
| EP | 2538290 | 12/2012 | |
| WO | WO-9809203 A1 * | 3/1998 | ......... G05B 19/4069 |
| WO | WO 2016/065491 | 5/2016 | |
| WO | WO 2016/065492 | 5/2016 | |
| WO | WO 2016/065493 | 5/2016 | |

OTHER PUBLICATIONS

Non-final office action issued in U.S. Appl. No. 15/495,671 dated Jul. 12, 2019, 55 pages.

EPO Communication and Extended Search Report in re EPO Appln. No. 17001899.8-1217 dated Jul. 18, 2018; 7 pages.

Lohse, Wolfram "*Evaluating Assistance for NC Machining Planning of Complex Milling Processes*"; ISBN: 978-3-86359-249-3; Pub. 2014 by Aachen Apprimus-Verl. (English Abstract Attached) Edition Wissenchaft—Apprimus; Werkzeugmaschine; Ergebnisse aus der Produktionstechnik, Bd. 2014, 38.

Vitr, Mirco "*CAM-NC Coupling for a Continuous, Bi-direction Flow of Information Between Planning and Production*"; ISBN: 978-3-863-590-789; Pub. 2012 by Aachen: Apprimus-Verl. (English Abstract Attached) Edition Wissenschaft Apprimus: Werkzeugmaschinen; Ergebnisse aus der Produktionstechnik, 2012, 19.

Non-final office action issued in U.S. Appl. No. 15/495,769 dated Jun. 26, 2019, 38 pages.

* cited by examiner

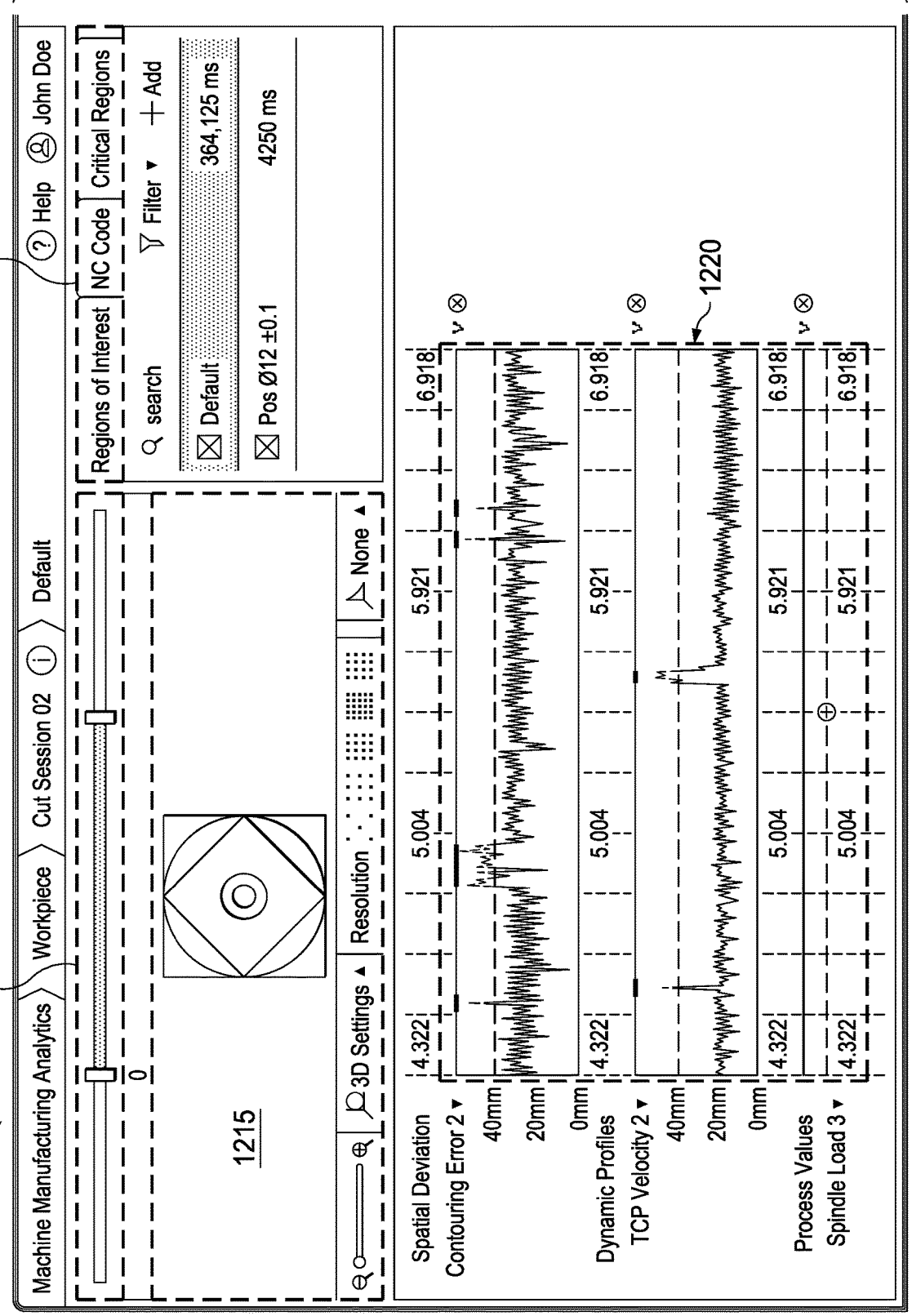

FIG. 12B

| Regions of Interest | NC Code | Critical Regions | | |
|---|---|---|---|---|
| Q search | | | ▽ Filter ▼ | |
| ID | Duration | | Deviation | |
| 156798 1 | 16 ms | | 0.002mm | |
| 156798 1 | 16 ms | | 0.002mm | |
| 156798 1 | 16 ms | | 0.002mm | |
| 156798 1 | 16 ms | | 0.002mm | |
| 156798 2 | 16 ms | | 0.002mm | |
| 156798 2 | 16 ms | | 0.002mm | |
| 156798 2 | 16 ms | | 0.002mm | |
| 156798 3 | 16 ms | | 0.002mm | |
| 156798 3 | 16 ms | | 0.002mm | |
| 156798 3 | 16 ms | | 0.002mm | |

(?) Help  John Doe

Regions of Interest | NC Code | Critical Regions

G0 X22.5362 Y1.2341
G1 F21.1 Z2.2
G3 F211.1 X21.B852 Y2.556 I1.5522 J2.2332
G0 Z2.1
G0 X1.5791 Y2.6566
G1 F21.2 Z1.1
G3 F422.0 X1.124 Y1.666 I2.1223 J-1.2564
G1 F21.1 X24.1212 Y1.4211
G1 F211.1 Y2.113
G1 Y3.133 Z1.2455
G1 Y3.334
G1 Y2.333 Z1.4444
G1 Y2.233 Z1.445
G1 Y2.312 Z1.1232
G1 Y2.775 Z1.1642
G1 Y2.888 Z1.8877
G1 Y3.411 Z1.2225
G1 Y3.549 Z2.6667
G1 Y2.3331
G1 F42.1 X21.3220 Y2.1530
G1 F411.1 Y2.775
G1 Y2.333 Z1.4433
G1 Y4.444 Z2.4455
G1 Y3.555 Z2.6999
G1 Y2.452 Z1.2451
G1 Y2.345 Z1.2222

FROM FIG. 12A

FIG. 13B

| Regions of Interest | NC Code | Critical Regions |
|---|---|---|

Q search  ▽ Filter ▾

| ID | Duration | Deviation |
|---|---|---|
| 156798 4 | 16 ms | 0.002mm |
| 156798 4 | 16 ms | 0.002mm |
| 156798 5 | 16 ms | 0.002mm |
| 156798 6 | 16 ms | 0.002mm |

| Regions of Interest | NC Code | Critical Regions |
|---|---|---|

G1 F21.1 Z1.1
G3 F211.1 X1.125 Y1.222 I2.1882 J-1.2222
G1 F21.1 X22.2244 Y1.8621
G1 F211.1 Y2.331
G1 Y2.132 Z1.2455
G1 Y2.118
G1 Y2.332 Z1.4344
G1 Y2.445 Z2.321
G1 Y2.234 Z1.1322
G1 Y2.552 Z1.1542
G1 Y2.312 Z1.1212
G1 Y2.216 Z1.1112
G1 Y2.321 Z1.2232
G1 Y2.3321
G1 F21.1 X24.1223 Y2.1342
G1 F211.1 Y2.332
G1 Y2.212 Z1.1131
G1 Y2.332 Z1.1523
G1 Y2.342 Z1.1224
G1 Y2.212 Z1.5577
G1 Y2.143 Z1.2342
G1 Y3.322
G1 Y2.132 Z-1.1132
G1 Y2.1232
G1 F21.1 X25.3434 Y2.1221

FROM FIG. 13A

MANUFACTURING PROCESS DATA COLLECTION AND ANALYTICS

CLAIM OF PRIORITY

This application claims priority under 35 USC § 119(e) to U.S. Patent Application Ser. No. 62/464,543, filed on Feb. 28, 2017 and also claims priority under 35 USC § 119(e) to U.S. Patent Application Ser. No. 62/466,821, filed on Mar. 3, 2017, both applications and their entire contents are hereby incorporated by reference.

TECHNICAL FIELD

The present disclosure relates to techniques for receiving real time manufacturing data and events from automation systems over real time and non-real time interfaces and associating the manufacturing data and events with sets of instructions provided to the machines for execution (e.g., numerical control (NC) code sentences). The present disclosure further relates to the processing of the associated manufacturing process data and events to provide and present interactive three-dimensional (3D) visualizations and advanced analytics for process engineers and other users in combination with the manufacturing processes.

BACKGROUND

Machines used for programmed manufacturing processes include machine tools, robots, 3D printers, or any other manufacturing system operating or controller with explicit use of 3D space. Computerized numerical control, or CNC, as well as other types of controls, including programmable logic controls (PLC), are commonly used in these machines. CNC is defined as the form of programmable automation, in which the process is controlled by the number, letters, and symbols of NC code. Other types of machines may use other types of code different than NC code, including PLCs using language such as Relay Ladder Logic (RLL), Sequential Function charts, functional block diagrams, structured text, instructions list, and continuous function charts, among others. These instructions allow for the programmable automation to be used for the operation of the machines. In other words, a machine is controlled by the set of instructions, e.g., an NC code or program or other format of code or program. In numerical control methods, the numbers form the basic program instructions for different types of jobs. The program executed can change based on the job type, where each program represents a different set of code.

Many of today's programmable machines are not equipped to transmit and receive continuous, high-frequency manufacturing data streams making real-time monitoring and control of these machines impossible. Further, tracing durations are limited to short durations for diagnostic purposes only. Previous systems collected data separately and without connection to one another, such that geospatial points, process values, and particular instructions were collected individually without connections required for analytics.

SUMMARY

One implementations of the present disclosure is directed to receiving manufacturing data and events over real time and non-real time interfaces and associating the data with one another. In one example implementation, a computerized method executed by hardware processors can be performed. The example method can comprise receiving real time data via a real time interface of a data collection system associated with a manufacturing process session, the real time data associated with a counter value assigned by a precision counter associated with an automation system. The received real time data is then stored in a storage buffer. Non-real time data is received via a non-real time interface of the data collection system, where the non-real time data is also associated with a counter value assigned by the precision counter associated with the automation system. In response to receiving the non-real time data, the storage buffer for stored real time data is searched for data with matching counter values to the counter value associated with the received non-real time data. In response to identifying stored real time data associated with a matching counter value, the non-real time data is associated with the located real time data based on the matching counter value. At least one data package can be generated that includes at least one set of real time data and non-real time data associated with matching counter values.

Implementations can optionally include one or more of the following features. In some instances, the method may further comprise transmitting the at least one generated data package to an analytics-based monitor and control system.

In some instances, in response to failing to identify stored real time data associated with a matching counter value receiving the non-real time data, the received non-real time data may be associated with an order, where the order of the received and non-matching non-real time data is after previously received real time data having a counter prior to that of the non-real time data and before real time data having a counter after the counter of the non-real time data.

In some instances, the storage buffer storing the real time data may only be searched after receiving the non-real time data and/or after a start condition associated with a particular trace is received.

In some instances, a matching counter value may be based on a counter value that is within a predetermined number of counter increments from another counter value.

In some instances, generating the at least one data package is performed in response to a determination that an end event or condition is received via the real time data or the non-real time data.

In some instances, generating the at least one data package is performed in response to a determination that the real time data storage buffer is full, where generating the at least one data package comprises emptying the real time data storage buffer in response to generating the at least one data package.

In some instances, the precision counter comprises a counter incrementing at defined constant intervals, where the counter is executed at the automation system. In other instances, the precision counter may be executed external to the automation system.

In some instances, at least a portion of the received real time data or the received non-real time data is ignored at the data collection system based on a defined trace configuration associated with the monitoring of the manufacturing process session.

In some instances, at least a portion of the real time data comprises positional or non-positional data for at least one component of a physical machine associated with the manufacturing process session, data received from the physical machine providing information identifying execution operations monitored during the manufacturing process session, and sensor data related to monitored forces or position information associated with the manufacturing process session. In some instances, at least a portion of the non-real time data comprises data including a current instruction execution at a particular time, a received user interaction associated with a physical machine associated with the manufacturing process session, and physical machine-related events occurring during the manufacturing process session.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

Another implementation of the present disclosure is directed to receiving visualizing two-dimensional (2D) metric data in connection with a three-dimensional (3D) visualization data of a manufacturing process. In one example implementation, a computerized method executed by hardware processors can be performed. The example method can comprise presenting a 3D visualization of machine-related data from a manufacturing process session for manufacturing a particular workpiece, where the manufacturing process is performed by a machine operating in 3D, and where the machine-related data is associated with a path taken by a tool or end-effector associated with the machine and/or the machine itself during the manufacturing process session. At least one 2D data set representing a metric associated with manufacturing process session is presented, and a selection of a particular 2D metric set is received for presentation within the presented 3D visualization of the machine-related data. A connection between values of the 2D metric set and the machine-related data of the 3D visualization is determined, and, based on the determined connection, the selected 2D metric set is incorporated into the 3D visualization of the machine-related data.

Implementations can optionally include one or more of the following features.

In some instances, the 2D metric set can comprise a metric value evaluated over a period of time during the manufacturing process session. In those instances, determining the connection between values of the 2D metric set to the machine-related data of the 3D visualization can comprise connecting the metric values of particular times from the 2D metric set to the visualizations of the machine-related data at the corresponding particular times.

In some instances, the 2D metric set can comprise a metric value evaluated over a distance traveled during the manufacturing process session. In those instances, determining the connection between values of the 2D metric set to the machine-related data of the 3D visualization can comprise connecting the metric values associated with particular distances traveled to the visualizations of the machine-related data at the corresponding distances traveled.

In some instances, the machine-related data in the 3D visualization can comprise machine-related data defining an actual path taken by a tool or end-effector associated with the machine and/or the machine itself during the manufacturing process session. In other instances, the machine-related data in the 3D visualization can comprise machine-related data defining a path expected to be taken by the path taken by a tool or end-effector associated with the machine and/or the machine itself based on a set of movement instructions provided to the machine during the manufacturing process session.

In some instances, the selected 2D metric can comprise a measured parameter captured during the manufacturing process session or a calculated parameter derived from one or more measured parameters captured during the manufacturing process session. In other instances, the selected 2D metric can comprise a calculated value determined by comparing an actual path taken by the machine during the manufacturing process session to a path expected to be taken by the machine based on a set of movement instructions provided to the machine during the manufacturing process session.

In some instances, incorporating the selected 2D metric set into the 3D visualization of the machine-related data can comprise presenting the selected 2D metric set on the 3D visualization. In those instances, a 3D computer-aided design (CAD) visualization of the workpiece can be presented in connection with the 3D visualization of the machine-related data, wherein the selected 2D metric set is presented on the 3D visualization at an angle based on an orientation relative to presented workpiece. In those instances, in response to a rotation of the workpiece, the presentation of the selected 2D metric set incorporated in the 3D visualization is rotated in connection with the rotation of the workpiece.

In some instances, at least a portion of the selected 2D metric set, when incorporated into the 3D visualization, is presented in a reduced scale.

In some instances, the 3D visualization is presented in a first presentation area in a user interface, and, at least prior to selection, the at least one 2D metric data sets is presented in a second presentation area in the user interface separate from the first presentation area.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

Another implementation of the present disclosure is directed to viewing a plurality of related presentation areas linked to a set of machine-related data. In one example implementation, a computerized method executed by hardware processors can be performed. The example method can comprise presenting a machine-related data set associated with a manufacturing process session performed by a machine for manufacturing a particular workpiece, the machine-related data set representing a common underlying data set presented in a plurality of presentation areas, where each presentation area is associated with a separate view on the machine-related data set. Within a particular one of the presentation areas, a selection of a particular group of data points is identified and the presentation of the particular presentation area is updated based on the selected group of data points. Reference values associated with the common underlying data set are identified based on the selected group of data points. For each of the other presentation areas, a particular set of data included in the particular other presentation area corresponding to the identified reference values is identified, the particular other presentation area is updated based on the identified particular set of data corresponding to the identified reference values.

Implementations can optionally include one or more of the following features.

In some instances, the plurality of presentation areas includes at least two of a three-dimensional (3D) visualization of a path taken by a tool or end-effector associated with the machine and/or the machine itself, at least one two-dimensional (2D) data set representing a metric associated with the manufacturing process session, a set of instructions provided to the machine during the manufacturing process session, a set of critical regions, and a time slider.

In those instances, the reference values associated with the common underlying data set comprise a set of time values associated with the manufacturing process session.

Alternatively, in those instances, the reference values associated with the common underlying data set comprise a distance traveled on the path taken by a tool or end-effector associated with the machine and/or the machine itself, where locations traveled on the path are associated with reference time values.

Alternatively, in those instances, the reference values associated with the common underlying data set comprise a spatial reference associated with the manufacturing process session.

In some instances, the selection of the particular group of data points comprises a selection of a time range in the particular presentation area.

In some instances, the selection of the particular group of data points comprises a selection of a spatial area within the 3D visualization of the path taken by a tool or end-effector associated with the machine and/or the machine itself, wherein the particular group of data points comprises a non-sequential set of data points.

In some instances, the selection of the particular group of data points comprises a selection of at least one instruction from the set of instructions provided to the machine during the manufacturing process session.

In some instances, the path taken by a tool or end-effector associated with the machine and/or the machine itself comprises an actual path taken by the machine during the manufacturing process session or a path expected taken by a tool or end-effector associated with the machine and/or the machine itself during the manufacturing process session based on the set of instructions executed by the machine.

In some instances, identifying the reference values associated with the common underlying data set based on the selected group of data points in the particular presentation area comprises accessing metadata associated with the particular presentation area to identify associations to the common underlying data set.

In some instances, the selection of the selected group of data points is performed automatically based on an identification of at least one critical region associated with the particular presentation area, where the critical region is associated with values exceeding a defined threshold value.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

Another implementation of the present disclosure is directed to comparing two or more sessions of a manufacturing process are described. In one example implementation, a computerized method executed by hardware processors can be performed. The example method can comprise identifying a particular metric associated with execution of a manufacturing process, the particular metric evaluated in a plurality of manufacturing process sessions for at least one manufacturing process. A particular session from the plurality of manufacturing process sessions is identified as a baseline session, wherein at least a portion of the remaining plurality of manufacturing process sessions are to be compared to the baseline session. In a primary portion of the presentation area, a visualization of the values of the identified metric associated with the identified particular session is presented. In a secondary portion of the presentation area, visualizations of the values of the identified metric associated with at least a portion of the other manufacturing process sessions from the plurality of sessions are provided.

Implementations can optionally include one or more of the following features.

In some instances, in response to identifying the particular session from the plurality of manufacturing process sessions as a baseline session, at least one of the other manufacturing process sessions are automatically normalized to the baseline session based on a characteristic of the identified particular session. In some of these instances, the characteristic of the identified particular session comprises a time period over which the identified particular session was performed. In some of these instances, normalizing the at least one of the other manufacturing process sessions comprises compressing or expanding visualizations of the at least one of the other manufacturing process session over the time period of the identified particular session, where the at least one of the other manufacturing process sessions was performed over a different time period than the identified particular session.

Alternatively, the characteristic of the identified particular session comprises a traveled distance of the machine performing the manufacturing process.

In some instances, the identifying the particular session from the plurality of manufacturing process sessions as a baseline session comprises initially presenting at least a portion of the plurality of manufacturing process sessions via a user interface and receiving, via the user interface, a selection of the particular session by a user associated with the user interface. In those instances, the method further comprises receiving, via the user interface, a selection of a new session from the presented portion of the other manufacturing process sessions as a new baseline session. In response to receiving the selection of the new session, a visualization of the values of the identified metric associated with the selected new session are presented in the primary portion of a presentation area. In the secondary portion of the presentation area, visualizations of the values of the identified metric associated with at least a portion of the other manufacturing process sessions from the plurality of sessions are presented.

In some instances, the visualization presented in the primary portion of the presentation area is at a first level of detail and the visualizations presented in the secondary portion of the presentation area are at a second level of detail, wherein the first level of detail is a relatively higher level of detail than the second level of detail.

In some instances, at least a portion of manufacturing process sessions in the plurality of manufacturing process sessions are performed on different machines performing a common manufacturing process to machine a workpiece. In the same or other instances, at least a portion of manufacturing process sessions in the plurality of manufacturing process sessions are performed on different machines performing different manufacturing processes, where the different manufacturing processes each machine a common workpiece.

In some instances, the identified particular session is automatically identified initially, where the identified particular session comprises a simulated session based on averaged metric values of at least a portion of the plurality of manufacturing process sessions.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 12A-B and 13A-B illustrate example interactions provided by the multiple window or presentation area presentation of different views on a common underlying set of data associated with a manufacturing process session.

DETAILED DESCRIPTION

Figure 1:
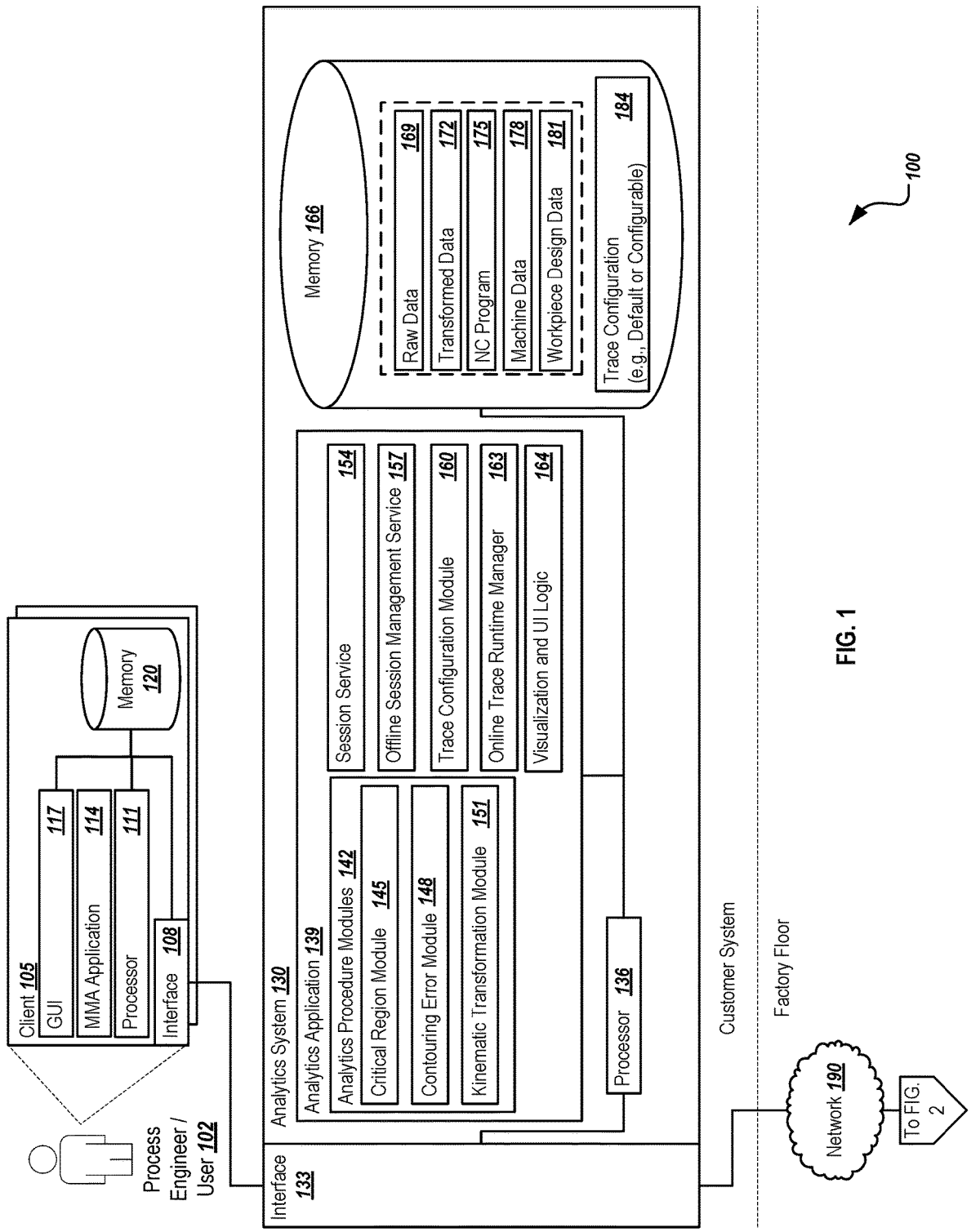
FIGS. 1-3 are a block diagram illustrating an example system 100 for contextually associating the data from various production sessions, generating a common set of data for visualizing the session's actual and expected operations, and for analytically evaluating one or multiple sessions associated with a particular workpiece or aggregations of workpieces.

The present disclosure relates to the correlation and combination of data from across machines (e.g., in a production or manufacturing facility or location, among others), tools, end effectors, raw material and their related systems, controllers, and associated sensors in a manufacturing and/or industrial system including operations and ambient environmental conditions. Further, this disclosure describes a group of related solutions in providing visualizations and analytics related to the operations, execution, and comparison of the operations of such machines via intelligent and advanced operations and analytical capabilities.

Workpieces are components manufactured during subtractive manufacturing processes in which 3D objects are constructed successively by cutting, shaping or other forms of deformation. Conversely, workpiece can also be manufactured by additive or joining processes. In the present disclosure, the subject of a particular manufacturing process is defined as a workpiece.

In general, the systems described herein allows for the contextualization, evaluation, and visualization of monitored data associated with one or more sessions and operations of a particular machine, tool, or other manufacturing component operating and/or moving in a three-dimensional (3D) space. Such manufacturing machines may include CNC controlled devices (e.g., multi-axis milling machines, robots, 3D printers, each with and without PLCs, etc.), probe and measurement systems, PLC-based assembly and pick and place-enabled machines, other PLC-based systems, as well as machines equipped with additional control and supervision systems, e.g., human-machine interfaces (HMIs) and additional sensors. The additional sensors may include, but are not limited to, laser interferometers, intelligent tools, ambience sensors, messengers, and other sensors capable of capturing and reporting on operations as performed by the monitored manufacturing machines or any of its components or subsystems, such as a tool, jigs, or the workpiece itself. The manufacturing machines may interact with other systems of the same functionality, or may be part of a larger construct or machine line where a series of operations are performed over or by several different manufacturing machines. The CNC devices, industrial robots, and other physical machines operate in a 3D space, with portions and/or components of the machine moving in different directions and/or on different axes when operational.

The velocity of the system enables in-process workpiece quality features, such as dimensional/geometric error assessment and detection of root causes for detected issues. By correlating—either via user interaction or algorithmically—relevant variables (e.g. raw material, manufacturing data from preceding operations, ambient and other data) and monitored data related to the manufacturing process (e.g., a machining process, a workpiece generation process, etc.), quality features such as inaccurate workpiece dimensions and poor surface integrity can be computed, visualized (and eventually corrected) such as chatter and other relevant calculations and comparisons. The system uses primary, e.g. drives bus, or aggregate (provided by the numerical and other controllers) encoder data for position, velocity, and direction, as well as other sensor signals/process variables and events from connected controllers. Other signals and process variables are also obtained in addition to the primary encoder data. The system uses measurement system data for calibration and validation of its algorithms, and can provide visualizations of the actual and expected data (e.g., expected actions/operations based on the commanded set of instructions), as well as one or more of the measured or calculated values. The resulting data and visualizations can also provide clear and detailed information regarding a particular machine's health and that of the processes executed by those machines.

The operations of particular machines and their tools, effectors, or other moving components or subsystems can be directed by a particular set of instructions, which in some instances may be numerical control (NC) code and/or programs, as well as other types of code, where appropriate. The set of instructions is provided to the machines and other components, and during execution the set of instructions is interpreted and interpolated, and may be associated with an expected output, such as finer or commanded values sent to various sub-systems, such as motors, drives and lasers. The expected output may be associated with machine or subsystem data, operations, identifiers, and/or sensor data from sensors associated with the machine or subsystem. Expected output can also include a relative or absolute location of a part or component of a machine, an operational state of the machine or collection of machines, a workpiece identifier, or whether a particular part or the whole of the machine is on or off, among others. Based on the expected output, particular expected actions or operations of the machine or subsystem, including the machine's (or it's associated tools or other components) expected movements, can be identified that can later be compared to the actual output of the machine. Sensor and machine data associated with the actual execution or output of the particular set of instructions, e.g. NC code, when executed is captured by the machine, associated sensors, and other information-capturing devices, components, or elements. This information can be mapped together to identify and define a correlation between the two data sets, allowing the comparisons and evaluations of the expected and actual values to be performed and visualized for users.

This mapping between the two (i.e., expected and actual actions), provides extensive insight previously unavailable. Data provided by the machine of the actual actions performed can provide some analytical result, but does not allow for a comparison against the expected data. When combined with the expected actions, significant insight can be obtained in order to provide a valuable comparison and evaluation of the relative performance in the actual instance as compared to the expected instance, including further insight as to potential bottlenecks, issues, or other problems that may occur in the manufacturing arena.

In a first solution, various machine-related information is received at different times and from various locations, e.g., sources, subsystems with controllers, sensors, etc. Receiving at different times may mean that data originates from sources operating in their own time frame or other information not available in a real-time basis, such as jitter (i.e., irregularity of electronic signals), latency (i.e., time interval between stimulation and response) of the source emitting the data, and/or events or other inputs that are not directly timed to the operations of the system. The information may be monitored, received, and/or caused by a controller or other automation system associated with the machine and its moving components performing the manufacturing process. However, prior solutions were unable to coordinate and link such information when incoming data and information was received or generated at different times, such as where at least some of the information was associated with a transformation or additional computation before being sent to a transactional or other data collection system. The first solution offers a solution to allow contextual linking and association of data as it is received through various inputs. To do so, a high precision counter incrementing with a high frequency (e.g., at or near the highest frequency of incoming information, or at another suitable frequency) is introduced to the system. The frequency of the counter can be any suitable frequency, and can include the highest unit of frequency needed to correlate data (e.g., based on the highest frequency clock or timing between deterministic data streams. The high precision counter may be included at an automation system or it may itself be an external signal received at the controller or machine. As inputs are received from the machine and the related sensors, the current counter value of the high precision counter is associated with the received or identified input. The automation system or controller can provide the input with the counter value to a further system for processing and association. In some instances, the automation system may act as a pass-through for some of the data to allow for real-time or near-real-time provision of the data to the data collection system. Other data, however, may be processed at the automation system and therefore be delayed in the sending of the data back to the data collection system, such that the data is provided to the collection system in a non-real-time manner. Without the counter values, such data may be difficult or impossible to link or associate with the real-time data already received at the collection system, such that future analytics and visualizations may not be possible. Data may be held at the data collection system until an end event or other signal indicating the end of desired session recording or tracing. The end of the tracing is not necessarily equal to the end of the manufacturing of the workpiece. This is important as control mechanisms described herein are utilized to control (and thereby reduce) the data volumes originating from the machine/sensors/controllers which are being forwarded to the data collection system. At that time, or at any other suitable time, including prior to an end event or determination, the data can be contextualized to other data based on the common counter values associated with the received real-time and non-real-time data. Once all data with a counter prior to the end event or end-associated signal is contextualized, the set of data related to the session can be provided to a data sink or analytic system for further modification and evaluation.

A second solution described herein relates to the 3D visualization of the operations of the manufacturing machine monitored and managed by the disclosed system. For example, the present solution allows for a detailed 3D visualization of the operations performed by the manufacturing machine or subsystem, as well as or instead the operations that are instructed to be performed by the manufacturing machine—always associated with the workpiece being manufactured. In some instances, the visualization can allow the actual operations performed to be compared to the operations as they were instructed, thereby allowing users such as process engineers to immediately identify potential variations and/or issues with the actual operations of the monitored machine. To generate the visualizations, the contextualized sets of data, which can include information describing the actual path taken by a tool or end-effector associated with the machine or the machine, e.g. machine tool, industrial robot, itself, the instructed path provided to the machine, a particular set of instructions and/or instructions associated with the instructed path, and other monitored and/or calculated information, can be independently transformed into a common underlying coordinate system. As the machine and its instructions may be based on differing coordinate systems (e.g., statically and dynamically changing coordinate systems within and across manufacturing sessions), the linking of the coordinate systems allow the received data to be placed into a common coordinate system, thereby allowing the data to be mapped in a uniform manner. Without the common underlying coordinate system, illustrations of the various data sets may not be connected, and therefore unable to illustrate the proper comparisons on a single coordinate system. When generating the visualization, a 3D computer-aided design (CAD) model of a workpiece, may be included in the visualization to show how the workpiece is being manufactured in reference to the actual path or commanded/expected path of the tool or end-effector associated with the machine or the machine, e.g. machine tool, industrial robot, itself. The 3D visualization may be interactive, such that users viewing the visualization may be able to manipulate and rotate the visualization of the paths and the workpiece. In addition to the visualization itself, a series of calculations and determinations from the actual and/or expected values can be derived. Those particular evaluations can be calculated and presented along with or in a separate visualization of the actual and expected paths or actions of the machine(s) or components thereof. In some implementations, the evaluations and calculations associated with the derived values can be presented in separate windows, panes, or areas of a user interface(s).

In a third solution, one or more two-dimensional (2D) sets of data associated with the various calculations may be obtained, but which were previously only able to be presented outside of the 3D presentation of the data—generally outside of the 3D canvas in which the 3D visualization is presented. Manual comparisons and analysis between the 3D visualization and the 2D representations were time-consuming for users and difficult to correlate. The present solution solves these deficiencies by allowing 2D metric data to be rendered on the 3D canvas associated with the 3D visualization of the data. By doing so, the portions of a particular path or spatial reference associated with calculated issues may be determined visually within the 3D visualization. In some instances, particular thresholds for calculated or monitored metrics may be identified as critical areas, that is, where the calculated and/or monitored values of the metric exceed or fall below an identified value (e.g., a raw percentage or value, a number of standard deviations from an average value, etc.). Using the presentation of the 2D metric data on the 3D visualization, particular areas associated with these critical areas can be immediately identified with a unique or distinguishing presentation. By visualizing and potentially labeling these areas over the 3D visualization, clear contextual insights may be gained. Using tools similar to those provided by the 3D visualization, users can receive a macro view of where errors have occurred or can focus on a particular section of the 3D model. In associated windows or as an annotated presentation, a list of events associated with particular critical regions can be provided on or adjacent to the illustration. In response to a user input selecting a particular critical region, the visualization can be updated to a time range and/or a path traveled in association with the error. In some instances, the underlying NC code or set of instructions presented in an adjacent window may be updated to show the corresponding section of the code and allow for immediate understanding of the context of the issues.

A fourth solution described herein relates to the presentation of related data in a single screen or visualization, wherein the related windows within the screen present data, calculations, and input linked to a common underlying data set, where the underlying data set (e.g., state machine) connects the various values and presented information within the related windows. In one example, the solution is called a four-way interaction solution, although any number of related windows or presentations may be used. In one implementation, windows may include a presentation of the 3D visualization, a presentation of at least one 2D metric or 2D metric data, particular set of instructions, e.g. NC code associated with the actual and expected paths of the manufacturing machine, and a slider indicating a particular time range and/or path traveled during a particular session of the manufacturing process.

In general, the four-way interaction allows users to interact with various aspects of the underlying data to present and update contextually-associated portions of the data via (e.g., four) different interconnected user interface controls to analyze different parameters and navigate portions of time and path traveled (e.g., total distance traveled, spatial reference, etc.) to obtain insights from the machine, which would otherwise have to be manually pulled and manually correlated from historical data. Some implementations may include fewer or more than four interconnected user interface controls. Through interactions with any of the available user interface portion (e.g., the different windows or areas), a connection to the underlying information is determined and identified. In response to a selection of a particular area, range, action, or point within one of the interfaces, a corresponding portion in each of the other interconnected windows is determined. Once determined, the presentations of those areas are updated to allow the corresponding views to be presented and made available to the user in connection with the selected portion of the first area in which the initial interaction occurred.

As noted, a particular implementation may include a time slider, a particular instructions selection box, e.g. NC code, an interactive 3-D visualization of the paths taken by tool or end-effector associated with the machine or the machine, e.g. machine tool, industrial robot, itself (and optionally an image of the workpiece being worked on or manufactured), and a 2-D chart region providing metric calculations and other detected or calculated parameters during a session. The time slider can allow users to slide or adjust each end of an interactive timeline in order to view a smaller portion of time (e.g., at a higher resolution or frequency of the underlying data) within a particular session. As the user interacts with the slider, an exact time at which the slider is positioned may be presented. When a period of time is chosen, corresponding data from the other user interfaces are automatically selected for viewing and comparison within that period of time based on the connection between the common underlying data set and other presentations. In some instances, the 3D visualization may be re-rendered to reflect the portions of the machine's activities that occurred during the time period, while the instructions selection box presents code, e.g. NC code, provided and/or executed corresponding to the selected time period. Any active 2D charts can be re-rendered for the time period to be shown, or alternatively, to highlight or otherwise emphasize the selected time period within the entirety of the session's data. The instructions selection area, e.g. displaying NC code, provides an interactive listing of the code associated with the actions performed by the machine. The instruction code selection area allows users to highlight a portion of code (e.g., a sequential or non-sequential set of particular instructions or commands), to focus on and/or to select. The selected code can be associated with a particular time or portion of the activity performed by the monitored machine. If any errors or critical regions are associated with particular portions of the instruction code, such portions may be highlighted in red or provided another similar emphasis or indication. Similar to time slider adjustments, when a section of code is chosen, corresponding data from the other interfaces are automatically identified as being associated with the selected code based on the code's connection to the common underlying data, with the other interfaces being updated and presented for viewing and further investigation based on the selection. To do so, the instruction code selected can be associated with a particular time or time period. In response to the selected code, the time period or corresponding portions traveled may be identified and provided to each of the related selectable areas, where those areas are then updated based on the corresponding time period or path traveled. In some instances, a separate structure may associate times to particular instruction code, such that when a particular portion of the instruction code is selected, the associated time can be determined based on the data in the structure.

A fifth solution described herein relates to the comparison of multiple sessions of a particular manufacturing process for a single machine or multiple machines. Previously, cross-session comparison was not possible as machine process data was not captured in a meaningful or consistent way, and temporal internal controller data was overwritten. Data from involved machines was also not visualized, so manual analysis was time consuming and difficult.

The solution described herein provides a pattern-based benchmarking tool where users are able to visualize digitized data from multiple sessions of production such that users can easily identify ideal configurations or determine shifts across session data sets which are significant to monitor and control process or product quality parameters based on a comparative visualization of the sessions. The pattern-based benchmarking process can allow users to identify an ideal or preferred session to set as a baseline comparison. Using a verified or selected baseline session, other sessions can quickly be compared to the baseline to identify errors, outliers, and/or relative performance comparisons.

Specifically, pattern-based benchmarking allows users to compare multiple sessions of production side-by-side in order to easily identify patterns of error. The design visualizes data from each session in, for example, the form of a line graph or timeline (e.g., the 2D presentation of metrics) for the user to analyze. Errors or issues that are identified as critical regions (e.g., above or below a default, automatic, or user-defined threshold) may be highlighted in red or otherwise distinguished. Users are able to identify an ideal session (e.g., the ideal session may be based on single sessions or multiple sessions or subsets thereof, a group of sessions, or a statistically generated example or optimal session, among others) during their review, select (e.g., via drag and drop, double-click, or other suitable UI interaction) that session as a baseline session, and generate a comparison of the selected baseline session against which all other sessions will then be benchmarked for quality assurance. In some instances, the session may not be an ideal session, but rather a session identified for another reason, including a desire to review the session in context with other sessions, as a starting point in comparing multiple sessions, or for a relative view of a session's results and/or data.

Pattern-based benchmarking may be performed using the 2D chart selection area. Further, because multiple sessions may be reviewed, the sessions need not be performed by the same machine. For example, multiple sessions may represent actions performed to generate a similar workpiece across different manufacturing systems each generating the workpiece via a different solution, order, or instructions, or via the same order and instructions using similar, but different machines. Alternatively, the sessions may be associated with the same manufacturing system where different instructions are used to produce the identical workpiece. Where the sessions differ in setup, the multiple sessions must be normalized over time or over the execution of the operations in order to compare execution with the baseline selection. Upon normalization, a similar comparison can be performed to accurately represent and evaluate the various sessions.

The pattern-based benchmarking can be used to compare execution as compared to particular thresholds that have been set in connection with at least one of the session data, and to use the thresholds to derive visual patterns across sessions for error detection and benchmarking. For example, if a particular contouring error threshold is set in a first session selected as the benchmark baseline, the threshold can be propagated down to the remaining sessions and used to evaluate a relative performance. When a new baseline is set, the baseline graph is updated with the selected session and a new normalization process can be performed in order to provide an in-kind illustration in the set of sessions.

The pattern-based benchmarking can be used by users to iteratively find a manually optimized context for future execution to produce workpieces optimally based on implicit/explicit understanding of relevant system behavior affecting the same. For similar systems, problems or issues with production and manufacturing can be identified based on errors or behaviors seen across a plurality of other systems, increasing the knowledge and expectations for existing and modified systems.

Figure 2:
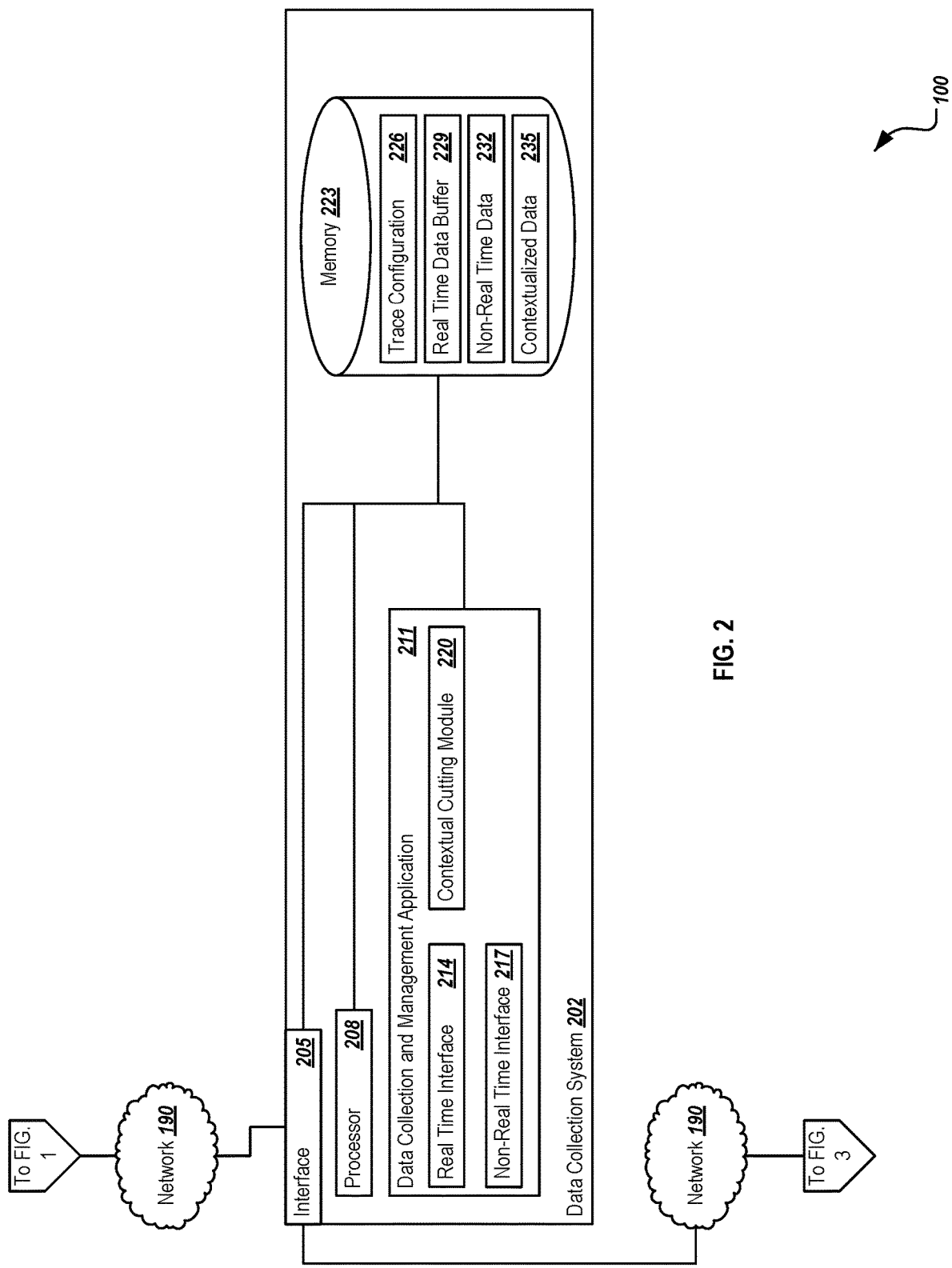
Figure 3:
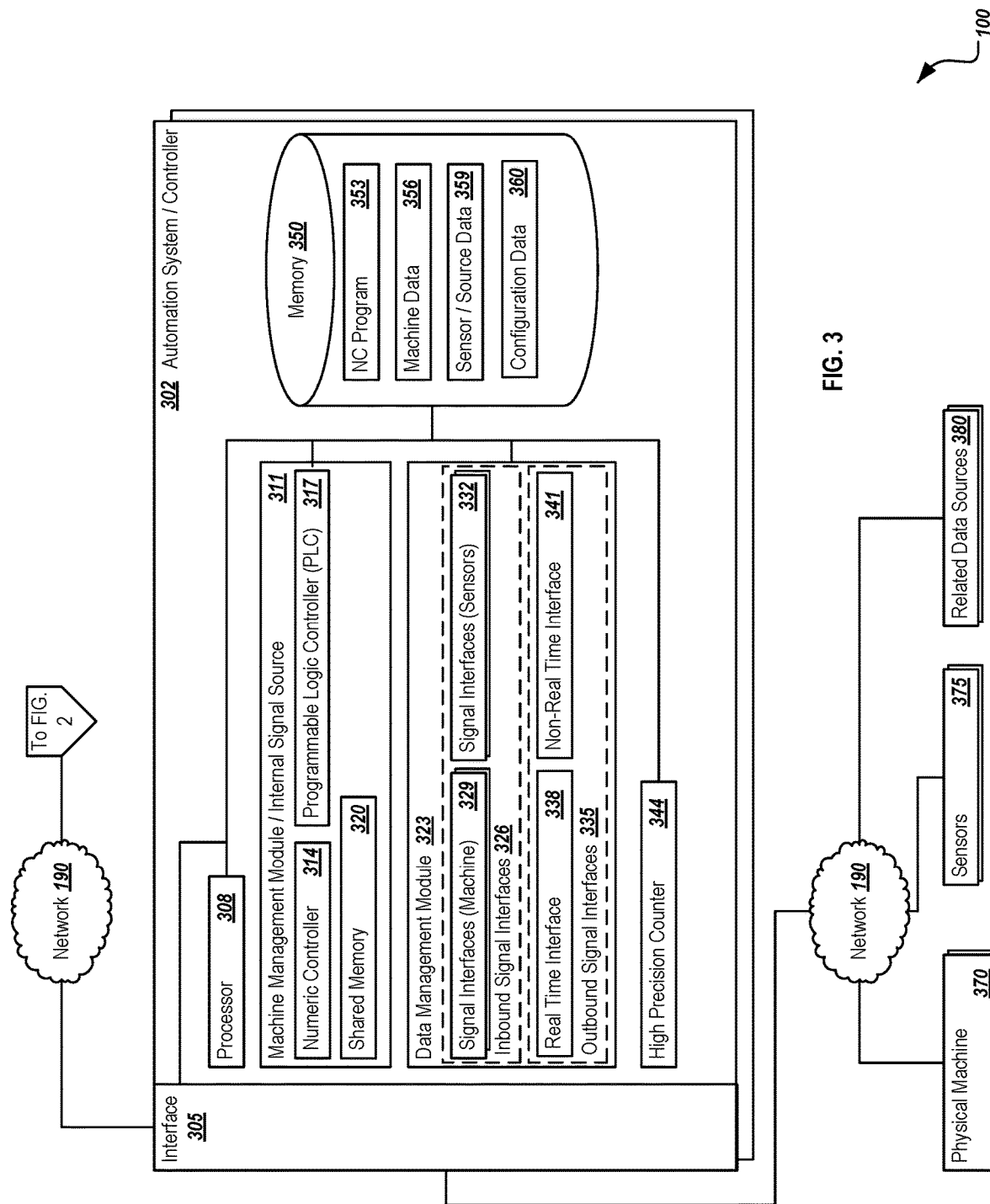

Turning to the illustrated implementation, FIGS. 1-3 comprise a block diagram illustrating an example system 100 for contextually associating the data from various production sessions, generating a common set of data for visualizing the session's actual and expected operations, and for analytically evaluating one or multiple sessions associated with a particular workpiece or aggregations of workpieces. System 100 is a single example of a possible implementation, with alternatives, additions, and modifications possible for performing some or all of the described operations and functionality. As illustrated in FIGS. 1-3, system 100 is associated with a system capable of sharing and communicating information across devices and systems (e.g., client 105, analytics-based monitor and control system 130 (or "analytics system 130"), data collection system 202), an automation system or controller 302, and one or more physical machines (machines, robots, 3D printers) 370 (along with any associated sensors 375 and data sources 380, among others) via network 190). In some instances, only a single physical machine 370 may be associated with the overall system 100, while in others, a plurality of physical machine 370 may be associated with the system 100. Further, a plurality of automation systems 302 may be associated with one or more physical machine 370, including where a single automation system 302 is associated with each physical machine 370 included in the system 100. Still further, each automation system 302 may be associated with a particular data collection system 202. In some instances, a single data collection system 202 may be associated with a plurality of automation systems 302. Although components are shown individually, in some implementations, the functionality of two or more components, systems, or servers may be provided by a single component, system, or server. Further, additional components may be included in alternative implementations that perform at least a part of the functions of the illustrated components.

As used in the present disclosure, the term "computer" is intended to encompass any suitable processing device. For example, client 105, analytics-based monitor and control system 130, data collection system 202, and automation system 302 may be any computer or processing device such as, for example, a blade server, general-purpose personal computer (PC), Mac®, workstation, UNIX-based workstation, embedded system or any other suitable device. Moreover, although FIGS. 1-3 illustrate particular components as a single element, those components may be implemented using a single system or more than those illustrated, as well as computers other than servers, including a server pool or variations that include distributed computing. In other words, the present disclosure contemplates computers other than general purpose computers, as well as computers without conventional operating systems. Client 105 may be any system which can request data and/or interact with the analytics-based monitor and control system 130 and, in some cases, one or more of the data collection system 202 and/or the automation system 302, as well as the underlying physical machine 370. The client 105, in some instances, may be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™ Android™, Windows Phone OS, or iOS™, any real-time OS among others.

To begin the overall description, the physical machine 370 is initially identified as the basis of the system, where the physical machine 370 represents a manufacturing device of any suitable type. Such manufacturing machines may include CNC controlled devices (e.g., multi-axis milling machines, robots, 3D printers, each with and without PLCs, etc.), probe and measurement systems, PLC-based assembly and pick and place-enabled machines, other PLC-based systems, as well as machines equipped with additional control and supervision systems, e.g., human-machine interfaces (HMIs) and additional sensors. Examples of the physical machine 370 may include a CNC tool loaded in a spindle or an end effector for robots and 3D printers, The physical machine 370, as illustrated, may be any suitable machine, industrial robot, or 3D printer, or other manufacturing machines operating in three dimensions, capable of interacting with a workpiece (i.e., the items or product being worked on and/or manufactured via operations of the physical machine 370) in a 3D space, along one or more axes of movement, linear or rotational, with portions and/or components of each physical machine 370 moving in different directions and axes when operational. In some instances, the physical machine 370 may act independently of other devices or tools, while in others the physical machine 370 may be part of an assembly line or other set of connected physical machine 370 or other machines, where the workpiece is passed or transferred from one manufacturing step and/or tool to another. The physical machine 370 may receive instructions from the automation system 302 (or controller), where the instructions are provided in any suitable format. For discussion and example purposes, the instructions described herein may be provided in a numerical control (NC) format, although other formats for the set of instructions may be used, where appropriate, such as a PLC format associated with, for example, assembly to end effectors of robot tools, among others. Thus, for this illustrated implementation, the instructions may be instructions sets, e.g. NC code 353 or NC programs that provide machine-level instructions for the operations of a particular process. The physical machine 370 can execute the instructions as provided, with internal information about the execution of those instructions being captured by the physical machine 370. The physical machine 370 can then provide information about the actual actions performed back to the automation system 302 for further processing and collection.

Additional sensors 375 may be associated with and may monitor the operations of a particular physical machine 370, a component of the physical machine 370, associated tools and jigs, the workpiece being manufactured, and the position of any of these or other parts of the manufacturing process, to provide additional insight and information about the actual execution of one or more manufacturing sessions. A particular sensor 375 may include, in some instances, at least one sensor plus at least one controller capable of transmitting sensor data based on automation and process protocols, in some instances via network 190. The additional sensors may include, but are not limited to, laser interferometers, ambience sensors (e.g., temperature sensors, acoustic sensors, pressure sensors, vibration sensors etc.), cameras (infrared, visible light, heat, etc.), messengers, and other suitable sensors, where the sensors 375 are capable of capturing and reporting on operations on the particular physical machine 370 and the machine 370 itself. The sensors 375 can provide further information than may be available from the physical machine 370 alone, and may be used to enhance the data set obtained by the automation system 302 from the machine 370. Still further, one or more related data sources 380 may also be added to the information collected by the automation system 302, including information received from particular HMIs (e.g., panels, keyboards, buttons, touch-screen interfaces, biometric input devices, etc.) associated with the physical machine 370, information on other user interactions, user inputs, and/or other events, information external to the particular monitored physical machine 370, as well as other relevant data. Data sources 380 may include the HMIs associated with the physical machine 370, sources of data providing context or information associated with or providing reference to particular actions and activities associated with the manufacturing process, or any other external sources of data or information potentially incorporated into the data captured in relation to particular manufacturing processes and operations.

As illustrated, information may be provided by the physical machine 370, the sensors 375, and the data sources 380 via network 190. Network 190 facilitates wireless or wireline communications between the components of the environment 100 (e.g., between the physical machines 370 and the automation system 302, between the automation system 302 and the data collection system 202, between the data collection system 202 and the analytics-based monitor and control system 130, and between the analytics-based monitor and control system 130 and client 105, among others), as well as with any other local or remote computer, such as additional mobile devices, clients, servers, tools, and/or other devices communicably coupled to network 190, including those not illustrated in FIG. 1-3. In the illustrated environment, the network 190 is depicted as a single network connecting multiple components, although network 190 may be comprised of more than one network without departing from the scope of this disclosure, so long as at least a portion of the network 190 may facilitate communications between senders and recipients. In some instances, one or more of the illustrated components (e.g., the analytics-based monitor and control system 130) may be included within network 190 as one or more cloud-based services or operations. The network 190 may be all or a portion of an enterprise or secured network, while in another instance, at least a portion of the network 190 may represent a connection to the Internet. In some instances, a portion of the network 190 may be a virtual private network (VPN). Further, all or a portion of the network 190 can comprise either a wireline or wireless link and/or a combination thereof. Example wireless links may include 802.11a/b/g/n/ac, 802.20, WiMax, LTE, and/or any other appropriate wireless link. In other words, the network 190 encompasses any internal or external network, networks, sub-network, or combination thereof operable to facilitate communications between various computing components inside and outside the illustrated environment 100. The network 190 may communicate, for example, Internet Protocol (IP) packets, Frame Relay frames, Asynchronous Transfer Mode (ATM) cells, voice, video, data, and other suitable information between network addresses. The network 190 may also include one or more local area networks (LANs), radio access networks (RANs), metropolitan area networks (MANs), wide area networks (WANs), all or a portion of the Internet, and/or any other communication system or systems at one or more locations. In some instances, a portion of network 190 may be a local connection (e.g., between the physical machines 370, sensors 375 and the automation system 302) while another portion of the network 190 may be a connection to the Internet or to an Intranet-based system (e.g., between client 105 and analytics-based monitor and control system 130). In the present example, communications may be performed over any suitable connection, including Ethernet, a PROFINET connection, a wireless connection, or any other suitable standard. The PROFINET (Process Field Network) standard is the open industrial Ethernet standard of the PROFIBUS (Process Field Bus) user organization (PNO) for automation. PROFINET uses TCP/IP and IT standards, is real-time Ethernet-capable, and enables the integration of fieldbus systems. Other automation protocols may also be used for communications in the system, including process automation protocols such as fieldbus protocols.

As described, information and data from each physical machine 370 and its associated sensors 375 (as well as any other data sources 380) are provided to the automation system 302 via network 190. The signals from those components can be provided to specific inbound signal interfaces 326 of the automation system 302 (e.g., signal interfaces 329 for machine tool-communications and signal interfaces 332 for sensor- and data source-related data) associated with a data management module 323 of the automation system 302. Data received from related data sources 380 may include event indications from one or more human interactions (e.g., by a machine or tool operator (not shown)), an indication of particular operations performed by or instructions executed by the machine 370 associated with a start or end event of a manufacturing process for a session, specific location information associated with a moving tool, workpiece or jig in case of machine tool, an end effector in case of robots, as well as other suitable information associated with the actual execution of the instructions provided by the automation system 302.

As described herein, the automation system 302 may include or may be a controller of its associated physical machines 370, providing the instructions to be executed to the physical machines 370. In some instances, the automation system 302 may be included within, embedded on, or a part of a particular physical machine 370. The automation system 302 can provide the operation instructions (i.e., the contents or code of instructions sets, e.g. NC program 353) to the physical machine 370 of type machine tool for execution. The automation system 302 may include a machine management module 311 which performs tasks associated with controlling the one or more physical machines 370. As illustrated, the machine management module 311 may include a numeric controller 314, a programmable logic controller (PLC) 317, and a shared memory 320. In some instances, the machine management module 311 may only include one of the numeric controller 314 or the PLC 317, such as where the physical machine 370 is a robot (only the PLC 317 may be needed) or where the physical machine 370 is a purely NC-based machine tool (only the numeric controller 314 may be needed). The shared memory 314 is used to exchange data between multiple CPUs of different controllers involved in operating and controlling different machines. For example, the shared memory 320 may be any suitable memory and can allow the automation system 302 to provide instructions to be provided to the physical machine 370. The shared memory 320 can allow the instructions to be accessed by multiple CPUs and can be used to store or access the instructions being stored. In some instances, the instructions sets, e.g. NC program 353 may be accessed by the NC controller 314 and can be shared via related data sources, e.g., an HMI interface of the corresponding physical machine 370. The instructions sets, e.g. NC program or NC code 353 is loaded onto the NC controller 314 and the NC controller 314 can execute each NC line in sequence. Each NC line number executed (and, in some instances, the actual NC code, can be sent as an event to the data collection system 202 as described herein, along with a particular counter value. In some instances, the machine management module 311 and the data management module 323 may be a single component or different components, or they may represent functionality performed by the automation system 302, where such functionality could be performed by any number of components or elements.

In response to the execution of those instructions, data is returned to the automation system 302 via the inbound signal interfaces 326, and the automation system 302 can perform operations to enhance the data for further contextualization. Specifically, a high precision counter 344 is included in or associated with the automation system 302. As illustrated, the high precision counter 344 is included within the automation system 302—other implementations may place or include a counter 344 external to the automation system 302, such as where the counter 344 is one of the data sources 380. The high precision counter 344 may be a counter internal to the automation system 302 or it may be an input from an external data source 380. In general, the high precision counter 344 provides a unique counter value that precisely relates the counter to the ingested data values and events identified and received at the automation system 302. As data is received via the inbound signal interface 326 and/or generated within the automation system 302 itself, a corresponding counter value is associated with the data prior to further transmission or processing. Similarly, as instructions are issued from the machine management module 311, an appropriate counter can be associated with the instructions to associate data received by an inbound interface of the automation system 302 to correspond to instructions responsible for and/or triggering the specific data. In some instances, the machine management module 311 may manage the association of the counter value with particular data, while in other instances any other suitable component may perform the association.

Memory 350 of the automation system 302 may represent a single memory or multiple memories. The memory 350 may include any memory or database module and may take the form of volatile or non-volatile memory including, without limitation, magnetic media, optical media, random access memory (RAM), read-only memory (ROM), removable media, or any other suitable local or remote memory component. The memory 350 may store various objects, data, or instructions (e.g., instructions sets, e.g. NC programs 353 and instructions, machine data 356 received during the session, sensor and/or source data 359 obtained during the session, and configuration data 360). Memory 350 may store other suitable information, including user information, administrative settings, password information, system information data and/or physical tool data, caches, applications, backup data, repositories storing business and/or manufacturing process information, and any other appropriate information associated with the automation system 302 including any parameters, variables, algorithms, instructions, rules, constraints, or references thereto. Additionally, the memory 350 may store any other appropriate data, such as VPN applications, firmware logs and policies, firewall policies, communication instructions, a security or access log, print or other reporting files, as well as others.

The machine data 356 may include data received from the physical machine 370 during a particular session. In some instances, as the information is received via the inbound signal interfaces 326, the information from the physical machine 370 can be stored in the machine data 356 and annotated or otherwise associated with the corresponding counter value. The machine data 356 can also store relatively static machine configuration and set up data, such as axis configuration and machine offsets. In some instances, such information may be stored separately in the configuration data 360. Similarly, sensor and/or source data 359 received via the sensor signal interface 332 can be annotated and/or associated with the corresponding counter value from when the data was received. For instructions that are provided to the physical machine 370, the instructions sets, e.g. NC program 353 may be annotated or otherwise associated with the corresponding counter value.

The outbound signal interfaces 335 are used to send real-time and non-real time data to a data collection system 202 for further processing and contextualization. In some instances, the non-real time data can be sent from the related data sources directly to the data collection system 202 or the analytic system 130 without communication via the outbound signal interfaces 335. In such instances, the non-real time data may be associated with the corresponding counter value when the data is generated/sent or at the point of being received by the data collection system 202. As illustrated, a real time interface 338 and a non-real time interface 341 are provided, although additional channels may also be available. The real time interface 338 can be used to transmit raw information received at the automation system 302 to the data collection system in deterministic real-time, such as where the raw information is capable of being used immediately in its raw form. Conversely, the non-real time interface 341 can be used, for example, where additional processing of raw data is required at the automation system 302 before such information can be provided to the data collection system 302, or where alternate data not required for real time motion control or real time process control is obtained but not used in real time. Real time data is sent to the data collection system 202 and/or analytics system 130 from the automation system 302 (or, in some instances, directly from the physical machine 370 or sensors 375) regardless of whether data packets have been augmented with the high precision counter at the automation system 302 or not. Processing the real time and non-real time data occurs independent of the protocol used for communication. In other instances, the data can be enriched at other locations within the system 100. For any information transmitted via these interfaces, the associated counter value is sent along with the data or information to ensure that later contextualization can occur. In the illustrated example, non-real time information may be received with a certain delay through the outgoing non-real time interface 341, whereas real time information sent via the real time interface 338 is received in real time (deterministic, response within specified time constraint). In some instances, raw data received at the automation system 302 may be transmitted immediately, such as where no modifications, calculations, or other actions need to be performed before the data may be usable or readable. In other instances, the raw data received may need some processing, reformatting, or other modifications before being sent to the data collection system 202. In those instances, data not being sent in real time can be sent via the non-real time interface 341. Potential delays of the non-real time data reaching the next level of processing in the chain may be due to the difference in bus access control mechanisms implemented in 802.3 and 802.1Q. In one example, real time data is produced by cyclic execution of a data collection routine. For example, if a new line of instructions starts to be executed the counter value attached or related to the start of the new line of instructions is transmitted by the non-real time channel as an event while the position data of the axis is transmitted via a real-time channel. While the real-time channel is supported by the real-time operation system and is transmitted immediately, the non-real time channel data may be buffered first and transmitted eventually if transmission or processing capacity of the non-real time operation system allows to process and transmit it. The leads into a situation in some instances in which the data which has a relation through the counter values arrives at different points in time to the data collection system 202. As noted, the counter value identifies the first receipt of the data at the automation system 302, and can ensure that even where processing is required, such data can be placed at the appropriate location or in the appropriate order during further processing.

The term "real-time," "real time," "realtime," or similar terms (as understood by one of ordinary skill in the art), means that an action and a response need to be defined in a defined interval. The system has to complete a job between release time and deadline, or else this system will be in an undefined state. The real-time-data is produced by cyclic execution of a data collection routine as described above.

As illustrated, the automation system 302 includes interface 305 and processor 308. Interface 305 is used by the automation system 302 for communicating with other systems in a distributed environment—including within the environment 100—connected to the automation system 302 and/or network 190, e.g., physical machine(s) 370, sensors 375, and data sources 380, as well as data collection system 202, analytical system 130, and client 105, as well as other systems communicably coupled to the network 190. Generally, the interface 305 comprises logic encoded in software and/or hardware in a suitable combination and operable to communicate with the network 190 and other communicably coupled components. More specifically, the interface 305 may comprise software supporting one or more communication protocols associated with communications such that the automation system 302, network 190, and/or interface's hardware is operable to communicate physical signals within and outside of the illustrated environment 100.

Automation system 302 includes one or more processors 308. Although illustrated as multiple processors 308 in FIG. 3, a single processor may be used according to particular needs, desires, or particular implementations of the environment 100. Each processor 308 may be a central processing unit (CPU), an application specific integrated circuit (ASIC), a field-programmable gate array (FPGA), or another suitable component. Generally, the processor 308 executes instructions and manipulates data to perform the operations of the automation system 302, in particular those related to instructing and managing the operation of the physical machine(s) 370, receiving incoming data, and transmitting outgoing data to the data collection system 202. Specifically, the processor 308 executes at least a portion of the algorithms and operations described in the illustrated figures as performed by the automation system 302, as well as the various software modules and functionality, including the functionality for sending communications to and receiving transmissions from the automation system 302 and to the data collection system 202, as well as to other devices and systems. In particular, processor 308 can execute the machine management module 311 and the data management module 323 as appropriate, as well as to operations of the physical machine(s) 370 and/or sensors 375, where appropriate.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, Numerical Code (NC), as well as others suitable to the devices or system upon which they are executed.

System 100 further includes the data collection system 202. The data collection system 202 can perform operations associated with contextualizing data as it is received from the automation system 302. In some instances, the data collection system 202 may be associated with a single automation system 302, while in other instances, the data collection system 202 may be associated with a plurality of automation systems 302 and their respective physical machines 370. The data collection system 202 can execute a data collection, data processing and management application 211 that acts to receive, process and manage incoming data sent from the real and non-real time channels of a particular automation system 302 and can coordinate those sets of data based on an analysis of the data's value and/or the data's respective counter values as assigned at the automation system 302.

As illustrated, the data collection system 202 includes an interface 205, a processor 208, a data collection and management application 211, and memory 223. The interface 205 and processor 208 may be similar to or different from interface 305 and processor 308, respectively. In particular, interface 205 can manage communications and transmissions received at and transmitted from the data collection system 202, including receiving data from the one or more automation systems 302 via the real and non-real time feeds or channels established between the data collection system 202 and the automation systems 302. Processor 208 can execute the contextual cutting process managed by the data collection, processing and management application 211, as well as perform other suitable functionality associated with the data collection system 202.

The data collection and management application 211 is responsible for receiving and managing the annotated or counter-associated data received from the automation systems 302. In particular, data is received through various interfaces, including the real time interface 214 and the non-real time interface 217. The application 211 can cause the real time data to be stored in a real time data buffer 229 of memory 223. Data can be stored there for a particular session of a particular physical machine 370 until an end event is received or a determination that an end-related or end-indicating signal is received at the data collection system 202 for a particular session. The data may also be moved from the buffer 229 in response to a determination that the buffer 229 is full. Other determinations and decision points as to how long data can be stored in the data buffer 229 may manage the storage time and buffer, and those times may be longer or shorter than the receipt or determination of an end event or signal. One such determination may be the configuration of data collection system 202 for local, persisted storage of data either in addition to sending chunks of data to the analytics system 130, as well as the configuration of the analytics system 130 as known by the data collection system 202. Other factors may govern or assist in the decision, as well. As non-real time data is received via the non-real time interface 217, the counter value associated with the non-real time data can be compared to the counter values of the previously received real time data in the real time data buffer 229 by the contextual cutting module 220 or another process. Where the same counter value is identified, real time and non-real time data can be contextualized to one another, and can be stored in the contextualized data set 235. The process of contextualization can continue until an appropriate end event or signal defining the end of a session is received from the automation system 302 or another source, including one of the data sources 380. End events or signals may be explicit based on a particular user input, a specific "stop" event within the operations of the process, specific instructions in the instruction code, e.g. NC code, indicating a stop or end event, resource starvation within the process, errors associated in the process triggering a stop or end action, combined sets of data meeting an end event condition, or a known stop process or value. Further, an end event may be triggered if a user indicates an end or stop to tracing the process. In response to the end event or signal, the contextual cutting module 220 can format the contextualized data 235 into a finalized data set and transmit the data set to the analytical system 130 for analytical review and processing. The contextualized data set 235, or portions thereof, can be sent as a single data package upstream to the analytical system 130 or it may be sent as separate data packages depending on size and system requirements or settings. In some instances, a context starting event (e.g., an HMI-initiated starting action, a first instruction code sentence triggered after a start event, an automated execution of a process, a known or pre-defined process entry or value), may be received from the automation system 302 indicating that a start of a session has begun. Such contexts may cause a new buffer 229 or package to be created, or to associate data received after the starting indication with a new package. As additional data is received, it can be added to the data chunk as appropriate. If real time data is received, it can be kept in the buffer 229 for a particular period of time, or until a non-real time piece of data or information with the same counter value is received. When matching non-real time data is received, the matching real-time data can be added to the data package and removed from the buffer 229 and/or associated with the non-real time data via metadata or other linking process. Based on the connection of the counter values, the contextual cutting module 220 can associate the data and prepare data for transmission to the analytical system 130 for future processing.

Memory 223 may be similar to or different than memory 350, and includes the real-time data buffer 229, any local copies of the non-real time data 232, and the contextualized data 235. Memory 223 also includes configuration data, e.g., trace configuration 226 which determines what data is to be captured and considered relevant for future processing. Memory 223 can contain algorithms which for stand-alone local execution/processing of the data or as part of distributed algorithmic execution. Algorithms in memory are updated from analytic system 130 when required. In some instances, significant amounts of data that are not relevant or are not requested for monitoring can be excluded from the trace configuration 226 either statically or dynamically in response to event from analytics-based monitor and control system 130 or the automation system 302 and subsequent processing steps, such that data received from the automation system 302 may be deleted or not otherwise processed using the contextual cutting module 220. The trace configuration 226 can allow process engineers or other suitable users 102 to identify the data and information they view as important or relevant to evaluating a particular process, thereby allowing the data collection and management application 211 to simply ignore or delete the non-relevant data prior to performing the matching process. The trace and processing configuration 226 may be managed by or otherwise defined at the analytical system 130, as well as provided as a default configuration upon installation and/or initialization of the systems.

Figure 5:
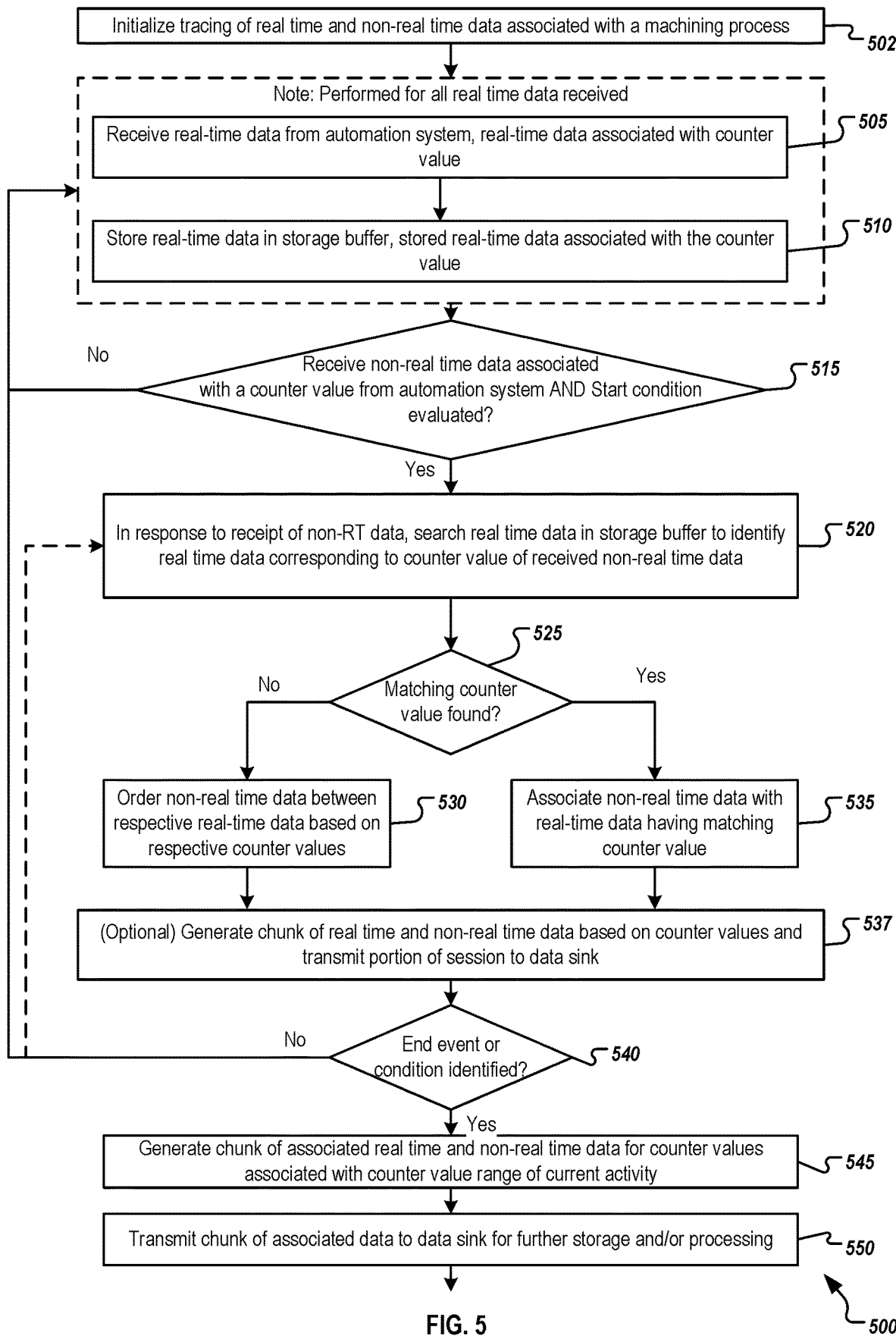
FIG. 5 is an example flowchart of a process for receiving real and non-real time data and performing the contextual cutting of the received data.

FIG. 5 represents an example flow 500 for receiving real and non-real time data as described herein and performing the contextual cutting of the received data. For clarity of presentation, the description that follows generally describes method 500 in the context of the system 100 illustrated in FIGS. 1-3. However, it will be understood that method 500 may be performed, for example, by any other suitable system, environment, software, and hardware, or a combination of systems, environments, software, and hardware as appropriate. In the present illustration, the process is performed at the data collection system 202 by the appropriate components and software.

Initially, it is noted that the data collection system 202 can continuously receive or obtain real-time and non-real time data from an automation system 302 during processing and operations performed at a physical machine or robot associated with the automation system. In other words, the process described herein is related to an ongoing process that can be performed multiple times as the machine executes its operations.

In some instances, a start context event or indication may be initially received from the analytics-based monitor and control system 130 and/or the automation system 302, indicating a new session or context is to be created or initialized. If the data collection system 202 is associated with a single automation system 302 and a single physical machine 370, this start context event or indication may indicate that any prior sessions should be closed (e.g., as determined at 540 in response to an end event or condition) and/or any buffers storing real time data and non-real time data may be cleared and transmitted, where appropriate. If no other sessions are currently being collected and contextualized, the first real time data received may be a first piece of data associated with a running session. In some instances, the first real time data may be the first relevant piece of real time data to be associated with a process or meeting any specified condition. Where other sessions associated with another automation system 302 and/or another physical machine 370 are started, data associated with those sessions may be started in a concurrent processing thread and real time buffer separate from other systems.

At 502, tracing for real time and non-real time data associated with a manufacturing process may be initialized. The initialization of tracing for a particular session may cause a data collection system 202 to subscribe to one or more available feeds or streams of data associated with a manufacturing process. In some instances, the initialization of tracing may include an identification of particular information to be subscribed to for the manufacturing process. In some instances, that may include all associated information, while in others, only a portion of the feeds or streams may be included. Further, the data collection system 202 may subscribe to all feeds/streams but may ignore or discard some data that does not match either the static tracing configuration associated with the initialization or the dynamically provided criteria/instructions from analytics-based monitor and control system 130 or the automation system 302.

At 505, real time data is received at the system from the automation system (or alternatively, from the physical machine or sensors associated with the physical machine in some cases bypassing the automation system), where each piece of data is associated with a unique counter value as generated by a high precision counter. As noted, the high precision counter may be a part of the automation system, or may be an incoming signal received at the automation system from an external system or source. At 510, the received real time data is stored in a storage buffer, with each piece of stored data associated with its corresponding counter value. In some instances, the data may be annotated or otherwise associated with the counter value. For example, if the buffer represents data stored in a database, the counter value may be stored in a field associated with the data in the database. In other instances, the counter value may represent an annotation via metadata associated with the stored data. In still other instances, the counter value may be concatenated onto the data prior to storage. For example, a set number of characters or a size of the saved data may be reserved for the counter value such that systems are easily able to determine and identify the corresponding counter value. In short, any other suitable manner of storing and associating the counter value with the stored real time data may be used.

At 515, a determination is made as to whether non-real time data is received from the automation system and a start condition has been evaluated. Alternatively, the start condition may be the driver for the session and may contain real time data (which may be a source of evaluation for the start condition). In general, non-real time data may be received at any time during a particular session. However, if no start condition has been met such that a session is being captured, then further consideration of the non-real time data may be necessary. As with the real time data, the non-real time data will also be associated with a counter value as assigned from the high precision counter upon the initial instance of the data being received at the automation system. If no non-real time data is received, then method 500 returns to 505 where additional real time data may be received. It should be noted that additional real time data may not be received before additional non-real time data is received, where method 500 returns to 515 for the receipt of additional data. If, however, non-real time data associated with a particular counter value is received, method 500 continues at 520.

At 520, in response to receiving the non-real time data, the stored real time data is searched to identify whether any real time data is associated with the counter value of the received non-real time data. At 525, a determination is made as to whether a match is found. In some instances, a match may be considered as found based on a relative nearness of counter values. For example, if an action is taken at time N, but sensor data is received at time N+2 counter values, a match may still be considered to be met. The relative threshold for non-exact "matches" may be built into the system as a default or may be dynamically determined based on potentially related or known connections of data within a predefined or dynamic time period. If no match is found, then method 500 continues at 530, where the non-real time data can be relatively ordered between any real time data with counters respectively higher or lower than the received non-real time data, where the non-real time data can be stored in a data package being generated for the session or a part thereof. In such instances, the non-matching non-real time data can be ordered based on respective counter values between other non-real time and real time data in the packages provided to the data sink. If, however, a match is found, then the non-real time data can be associated with the real time data having a matching counter value at 535. In some instances, the non-real time data can be stored within the real time data buffer, while in others the data may be removed from the buffer and stored as contextualized data outside of the real data buffer. In still other instances, the non-real time data may be stored separately from the real time data in the real time data buffer, where the stored non-real time data is connected to or associated with the corresponding real time data based on its counter value. The non-real time data may be associated with the real time data in a structured buffer or set of contextualized data, while in others, the non-real time data can be associated based on defined metadata associated with the session. In any event, the non-real time data and the real time data will be associated with the corresponding data sets in any suitable manner for further processing at the data sink. When preparing chunks for sending to a data sink (e.g., the analytics system 130), the data can easily be put together into a data package for transmission as related sets of information.

At 537, as well as throughout the collection of data in the process, a chunk of real time and non-real time data may optionally be generated based on related counter values and transmitted to the data sink before an end event or condition is received or identified. In some instances, this may be based on the real time buffer being full or of a particular fullness percentage. In general, buffer management and maintenance may take place throughout the collection process described herein, including at the beginning of the process to clear out any existing data from the buffer before data is collected for a session. During the process, the buffer may be cleared and existing data packaged and sent if the buffer is full or if particular conditions are met (e.g., 10 real time events are received). If the buffer is filled while the process is ongoing, the chunk of session data included in the buffer and in the associated set of non-real time data can be moved to another location and/or system for storage until an end event or condition is met, or can be packaged and transmitted to the data sink for storage or immediate processing (or alternatively, the data can be stored in local storage at the data collection system or elsewhere until a connection is made available, until a request for the chunk(s) is received, until an archive or transmission condition is met to trigger transmission or storage elsewhere, or at any other suitable time based on system configuration and operations) until the completion of the session, when the remaining associated data can be sent.

At 540, a determination is made as to whether the received events are associated with an end event or end condition for the executing session. While illustrated as a determination of whether the non-real time data is associated with an end event, the real time data received at 505 may also be determined to constitute an end event or end condition. The end event or condition may be a manual stopping of the process by a process engineer, human operator or any other suitable user interacting with the physical machine or related data source, e.g. HMI panel, a remote indication from another user authorized to stop the process, or an event signaling the completion of the instructions and operations associated with a session. Still further, the end event may not be explicit, but may instead by a known set of instructions (e.g., a final instruction in a set of instructions being performed) or data/signals that indicate that the session is completed or that an end event has occurred. Still further, an end event can dynamically provided via criteria/instructions from analytics-based monitor and control system or the automation system. If an end event or condition is not received or determined, method 500 can return to 505 to receive additional real time data and/or 520 to receive additional non-real time data. While the determination of the end event or condition is illustrated after receipt of non-real time data, the determination may be an ongoing determination performed throughout the process, including based on the receipt of real time data or combinations of real time and non-real time data or instructions received from other components of the system, e.g. 130.

If, however, an end event or condition is determined to have been received or is determined from the received data or instruction sets, method 500 can proceed to 545, where the context or session of data collection is closed. At this time, at least a chunk of associated and/or ordered real time and non-real time data is prepared for the current activity and session based on the counter values of the data as received by the data collection system 202. The chunks may be sent as a single set of data or individual chunks may be generated to manage the size of data sent. In some instances, at least some of the contextualized session data may already have been sent previously due to any number of factors, including a full or relatively full buffer, predetermined conditions associated with a clearing of the buffer or a sending of information before the close of the session, near-real-time analytics in analytic system 130, or any other reason such as system 100 configured for stream rather than set processing of session data. Based on the counter values, the information is received and processed in the correct order, where related events occurring in response to one another (e.g., instruction causes particular action), in connection with one another (e.g., during an action, a particular sensor reading is generated), or in a particular order (e.g., real time or non-real time data whose counter value does not match or correspond to another set of data) are associated and/or provided in the appropriate order for further processing. At 550, the chunks are transmitted to an associated data sink for further storage and processing, such as the processes described herein to further enrich, visualize, and interact with the received data. In some instances, the chunks may be provided to an analytical system for further processing, although any system may receive the contextualized chunks for further action. In some instances, similar to 537, the chunks/data can be stored in local storage at the data collection system or elsewhere until a connection is made available, until a request for the chunk(s) is received, until an archive or transmission condition is met to trigger transmission or storage elsewhere, or at any other suitable time based on system configuration and operations.

Returning to FIGS. 1-3 and system 100, the specific illustrations of FIG. 1 are reviewed. In particular, the analytics-based monitor and control system 130 and client 105 are presented. Upon completion of particular contextual cuttings of session data, the data collection system 202 transmits those chunks or packages of data as described to the analytics-based monitor and control system 130 for further processing, visualization, analytics presentations and control actions. Offline storage of data may also be provided as part of the data collection system 202, where data and chunks from the contextualization process can be optionally stored for periods of time prior to transmission to the analytics system 130 or elsewhere. In such instances, offline uploads of the data are available when connected, requested, or in response to a transmission request being received or transmission condition being met. In some instances, the analytics system 130 may be associated with or be a part of the data collection system 202.

In some instances, the analytics system 130 may be associated with a customer system remote from a factory or manufacturing location where the data collection system 202, the automation system 302, and the physical machines 370 may be located. In other implementations, the analytics system 130 may be located at the manufacturing location along with the other systems, where appropriate. In any event, the analytics system 130 allows advanced visualizations, analytics, further contextualization to be performed on the data received at and initially contextualized by the data collection system 202 and control actions to be performed on physical machine or subsystems thereof. The analytics system 130 may be a cloud-based system or may be associated with a dedicated or on-premise system, where appropriate. In any event, the analytics system 130 and its data are made available via network 190 to one or more clients 105 or other communicably connected systems, where visualizations and data may be displayed to allow for interactive investigation and monitoring of the captured data. In some instances, the analytics system 130 may be a machine manufacturing analytics (MMA) system, where the MMA can evaluate the performance of the machine based on the expected and observed data received from the machine and its controller/automation system 302.

As illustrated, the analytics-based monitor and control system 130 includes an interface 133, at least one processor 136, an analytics application 139, and memory 166. The interface 133 allows the analytics-based monitor and control system 130 to communicate with communicably coupled systems via network 190, and may be similar to or different than interfaces 205 and 305 in operation for the analytics-based monitor and control system. Similarly, processor 136 may be similar to or different than processors 208, 308, and is used to execute the instructions and functionality associated with the analytics system 130 as described herein. Memory 166 may be similar to or different than memories 223, 350, and can store the contextualized sets of information received from the data collection system 202, which can include raw data 169, machine data 178, and NC program 175 (or another type of instructions executed by the physical machine 370), among others, as well as transformed data 172 based on the information received from the data collection system 202, where the transformed data 172 is based on one or more kinematic transformations performed upon the received data, such as to generate a data set that provides a common underlying coordinate system. While illustrated inside the analytics system 130, memory 166 may reside outside of the analytics system 130 or be remotely location from the analytics system 130 in other implementations, and may be a data lake or storage cluster, among others. Data received from various inputs (e.g., the physical machine 370 itself, various sensors 375 and data sources 380) and the data provided or associated with the instructions sets, e.g. NC program code 353 and its commanded or expected values, as well as other data elements, may be presented in two or more different coordinate systems. Positional and spatial information may be represented in a multitude of coordinate systems, ranging from local, relative systems, to global coordinate systems. Examples would include axis positional information that would be in an axis coordinate system, typically based on either linear or rotary coordinate system. Machine positional information may be reflected in various machine coordinate systems in 3D space, which would be based on Cartesian Coordinate system. Workpiece design information may be expressed in a Design Coordinate System. In addition to the Design Coordinate System, various Workpiece Coordinate Systems may be defined, where the reference is a known and measurable point located on the workpiece. While any of the general coordinate systems can be used as a singular reference, a single Workpiece Coordinate System is typically chosen as the common coordinate system, and as such, values expressed in the various coordinate systems are transformed into a common coordinate system. To allow for presentation of the actual and expected values in a 3D visualization, the analytics system 130 must perform kinematic transformations of the received data to the common coordinate system in order to make available usable data for easy comparison, visualization, analytics-based monitoring and control.

The analytics application 139 may be a single application comprising multiple functionalities or may be a combined set of multiple applications, software, agents, or other functionality, as appropriate, including a distributed application between code executed on analytics system 130 and/or data collection system 202 and/or physical machine 370. In general, the analytics application 139 stores and transforms data received from the data collection system 202, associates and interacts with such data as it relates to particular sessions of the manufacturing or other machine process, presents the raw and transformed data into one or more visualizations to users (e.g., process engineer or other suitable users 102) to review differentials between actual and expected actions performed by the machines 370, and to identify particular inputs and data to be captured for future processing and/or visualization, among others. Alternatively, the application 139 communicates analytic results, e.g. differentials between actual or expected performance, predicted deviations to control application to initiate corrective actions by communicating events/commands to physical machine or subsystems.

As illustrated, the analytics application 139 includes an analytics procedure module 142, which as illustrated comprises a critical region module 145, a contouring error module 148, and a kinematic transformation module 151 (although the analytics procedure module 142 may contain other analytics procedure modules in other implementations), a session service 154, an offline session management service 157, a trace configuration module 160, and an online trace runtime manager 163.

The analytics procedure module 142 can perform various operations in generating and interacting with the data obtained from the data collection system 202. For example, the kinematic transformation module 151 can perform operations to transform both actual and expected data into a common coordinate system, which in some cases may be a prerequisite for interpreting and interacting with the data received at the analytics system 130 and describing the actual actions of the physical machine 370 while performing the set of instructions that describe an expected set of actions. The contouring error module 148 of the analytics procedure modules 142 can operate on the data after the transformation into the common coordinate system, where the contouring error module 148 calculates deviations from the actual path of a tool of the physical machine 370 as compared to the expected or commanded path as defined in the underlying instruction set (e.g., the NC program 175). The contouring error can be represented as a percentage of difference between the expected path and the actual path. Some contouring errors may exist based on extremely small impacts or imperfections in the physical machine 370, as well as based on vibrations and/or other movements at the machine or machine 370. In some instances, particular sizes of deviations may exceed a particular level and/or desired amount, which may lead to workpiece quality issues. In those instances, a critical region may be identified, such as by the critical region module 145. The critical region module 145 may identify particular thresholds for various metrics, including the contouring error, where critical regions may exist. When metrics and/or raw data violate the particular threshold, the critical region module 145 can identify those values as being a critical region. The particular critical region thresholds may be user-configured or defined, default values based on general deviation percentages or amounts, or they may automatically be determined based on a statistical review (e.g., more than a standard deviation variation, more than two standard deviations, etc.). The critical region module 145 can identify one or more particular critical regions within the data set and identify them as issues during or in the context of a particular presentation, visualization, and/or analytical review.

Figure 6:
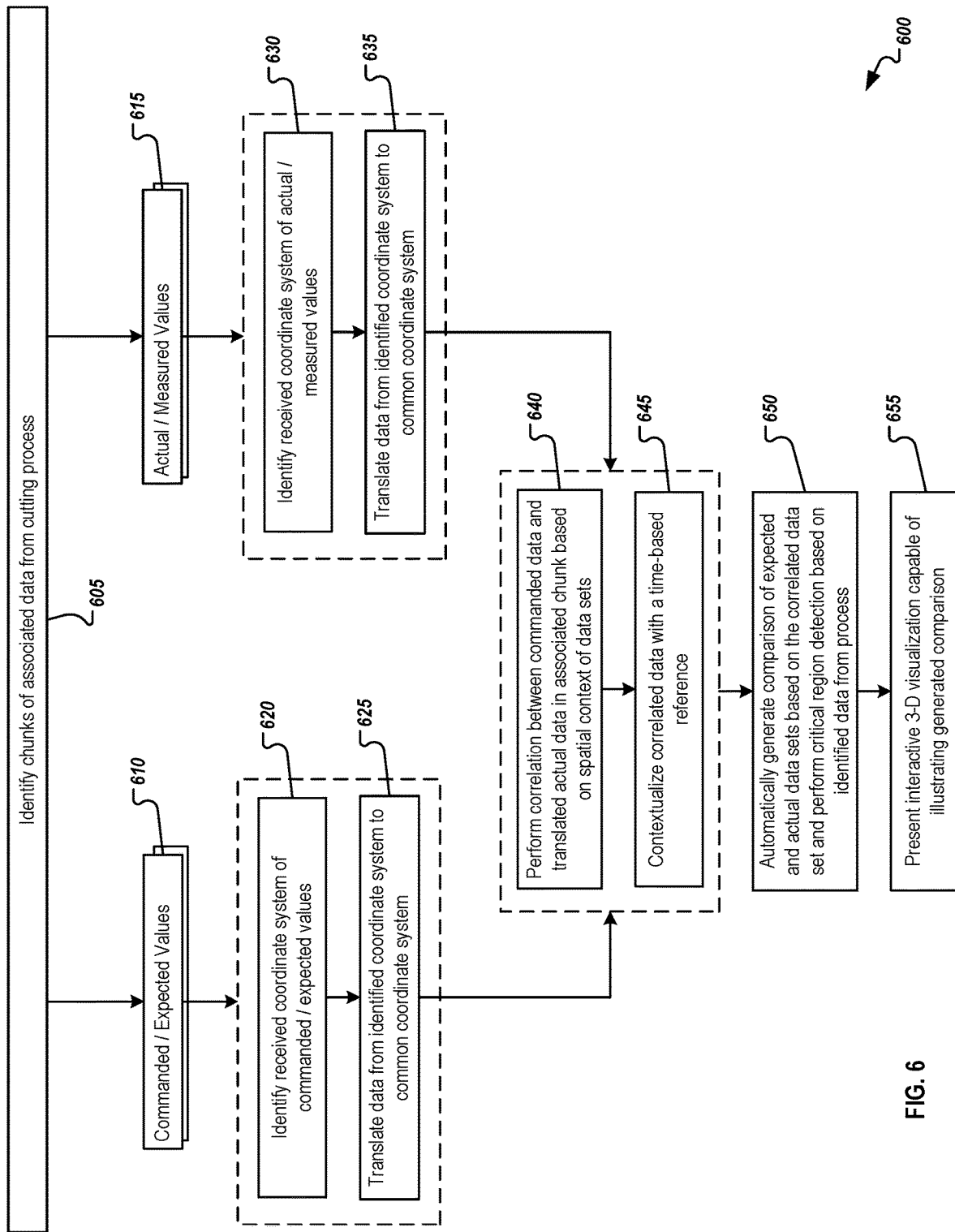
FIG. 6 is an example flowchart of a process for transforming the data of both expected and actual data sets into the common coordinate system, as well as determinations of potential critical regions based on contouring errors and other potential issues.

FIG. 6 illustrates an example process for transforming the data of both expected and actual data sets into the common coordinate system, as well as determinations of potential critical regions based on contouring errors and other potential issues. In particular, FIG. 6 represents an example flow 600 for transforming received expected and actual data values from the coordinate systems in which they are received into a common coordinate system, allowing those actual and expected actions to be compared in a particular visualization based on a common underlying coordinate system. Any suitable coordinate systems may be used. In some cases, at least some of the data may already be in the appropriate coordinate system upon receipt such that no further transformation may be needed. For clarity of presentation, the description that follows generally describes method 600 in the context of the system 100 illustrated in FIGS. 1-3. However, it will be understood that method 600 may be performed, for example, by any other suitable system, environment, software, and hardware, or a combination of systems, environments, software, and hardware as appropriate. In the present illustration, the process is performed at the analytics system 130 by the appropriate components and software, although other such systems or components may perform the operations in other implementations.

At 605, the chunks of associated data associated with the manufacturing process can be accessed for further transformation. In some instances of the system 100, method 600 may begin immediately or near-immediately upon receipt of the data from the data collection system 202 such that the transformed data is available in a real-time or near-real-time manner.

As illustrated, method 600 illustrates a split processing of the expected values 610 and the actual values 615, although the processing may be performed in a combined or similar manner across the actual and expected values. Further, different portions of the actual values 615, and in some cases, the expected values 610, may be associated with different coordinate systems even among their own type (e.g., two source of actual data with different coordinate systems) of data. Therefore, the actions of 620, 625 and 630, 635 may be performed concurrently or sequentially for various different portions of the actual and/or expected data.

At 620, the coordinate system of the expected values 610 is identified. The identification may be performed by an analysis of the received data, pre-existing knowledge of the coordinate system used by the expected data, or other information or metadata associated with the received expected data, or by user selection or configuration. In some instances, information about the set of instructions associated with the expected data may be analyzed or known and can be used to identify the particular coordinate system of the expected values. Upon identifying the received coordinate system, method 600 continues at 625 where the data in the identified coordinate system is translated to a common coordinate system used by the analytics system 130. In some instances, the common coordinate system may be a machine coordinate system or other suitable coordinate system. In some instances, the translation of the data to the common coordinate system may be a relatively simple shift of the data by a constant value in one or more planes. In other instances, the transformation may be a significant calculation and translation, where multiple mathematical kinematic transformations are required to place the received data into the common coordinate system.

The actual values 615 can have the similar operations 630, 635 performed upon them, where the particular coordinate systems of the received actual values 615 are identified at 630 and translated into the common coordinate system at 635. As noted, different portions of the actual values 615 may be in different coordinate systems such that each set of data within a session or chunk of a session may need to be processed differently.

While the illustrated method 600 includes the transformation of both expected and actual values into a common coordinate system, in some instances, expected or commanded values may not be available. In such instances, operations 610-625 will not be performed. However, each set of actual data can be transformed into the common coordinate system in order to allow a comparison of actual data received from various sources.

Once the transformations of the data are complete, method 600 continues to 640. At 640, the commanded data and actual data in the chunk or session are correlated based on the spatial context of the respective data sets. For example, mathematical connections are created between the actual and expected data based on where paths of the actual path taken by a tool or end-effector of the physical machine 370 went and where the expected values were expected to cause the path to go. In many instances, an exact match may not be available such that a detailed analysis of the actual and expected paths may be performed and particular actions or movements within the 3D area of the physical machine's tool path may be connected based on their relative spatial contexts. The expected values may be precise while the actual values and the paths they represent may be irregular based on vibrations or other phenomena occurring with the physical machine 370, unexpected movements during the actual operations, and other non-expected actions or results. Further, the timing of the actual data will differ from the timing of the expected data, as delays in implementing particular instructions may occur or be influenced by outside factors. In many instances, the set of instructions associated with the expected values may not specific a particular velocity of an action or may not require a particular timing of an action. If actual and expected values were associated based on timing alone, even a simple offset, the connections between the values may be off or incorrect. Therefore, correlating based on the spatial aspects of the path traveled allow for an accurate connection for future analytics. While the correlation is not based on a particular time the action occurred, at 645 the spatially-correlated data can be contextualized further with a time-based reference. The time-based reference can act as a connection or anchor for future visualizations and interactions, and may be assigned a time the actual data is associated with or the time the expected data is associated with. In many instances, the time the actual data occurred may be a more helpful anchor, as users can review the timing of the actual execution of the operations instead of the time of the expected operation (e.g., when a particular instruction set was provided). In some instances, the contextualization may be associated with the basis of the expected data, that is the instruction set (e.g., NC program instructions or code) that defines what the expected actions are when executed. In such instances, the set of instructions can be associated with the corresponding time reference, thereby allowing further connections amongst the expected and actual data values for future reference and comparison.

At 650, a comparison of the correlated data sets can be automatically performed, if both actual and expected values are available. Alternatively, or in addition, one or more critical regions can be determined at 650, where critical region detection may be based on a comparison of expected vs actual values, but can also be executed/performed on other data sets including only actual values (e.g., actual force or vibration data). For example, a contouring error across the paths taken and expected can be determined, and, in some instances, one or more critical regions may be identified based on the contouring error. In some instances, the comparison may identify particular time or location references associated with the correlated sets of data such that, when a presentation of any metric or visualization associated with the session is viewed, that one or more indicators of particular critical regions are illustrated. For example, particular points or portions of a path traveled illustrated within a 3D canvas may be highlighted, emphasized, or otherwise distinguished to indicate where a critical region exists. Similarly, if a presentation of particular instructions sets is provided in a window associated with the presentation, one or more instructions associated with a critical region can be highlighted or shown with a distinguishing feature, such as a color-coded presentation. Still further, if a 2D metric is presented then any determined critical regions may be presented in a different color, highlighted or shaded, or otherwise distinguished from the portions of the metric that are not associated with a determined critical region. As users may be able to adjust the definition and/or thresholds associated with critical regions, what is considered a critical region may dynamically update in response to user modifications to the threshold values. Additionally, dynamic thresholds may be determined based on updated models, either within a particular manufacturing process or across different manufacturing processes. In other words, thresholds for critical region detection may be user- or system-defined, and may be static or dynamic values/amounts.

At 655, an interactive 3D visualization associated with the actual and/or expected data can be presented. In some instances, information associated with the comparison of 650 can be presented within user interfaces.

Returning to FIGS. 1-3, the analytics application 139 also includes a session service 154. The session service 154 may be an application programming interface (API), a set of APIs, or other modules or agents of or associated with the analytics application 139 that allow users (e.g., process engineers or other suitable users 102) to view historical and ongoing sessions associated with one or more manufacturing processes that are or have been monitored, captured and controlled by the system 100. The session service 154 can interact with at least some of the data (e.g., raw data 169, transformed data 172, NC program code 175, machine data 178, and workpiece design data 181, among others) to provide information about particular individual sessions, groups of sessions, and/or portions of sessions. In some instances, the session service 154 may provide information about a currently executing session from which data is being collected and prepared. In others, the session service 154 may provide access to previously performed sessions stored in memory 166. In general, a session may be defined as a recorded trace with a defined start and end associated with a particular manufacturing process performed by one or more physical machines, e.g. machine tools, robots and related tools/end-effectors from which data is collected and made available. While not shown in memory 166, some or all of the stored data may be separated in or specifically associated with particular sessions executed and monitored by the illustrated systems. To access and present data, particular sessions can be identified and the associated data loaded for interaction and visualization.

The offline session management service 157 may be an API, a set of APIs, or other modules or agents of or associated with the analytics application 139 that handle ingestion of session data in an offline mode (e.g., via file or archive loading). In some instances, the offline session management service 157 may include a GUI within the analytics application 139 that allows users to load archived historical data.

The analytics application 139 includes a trace configuration module 160. The trace configuration module 160 allows users or system components such as control application to define particular trace configurations 184 to be pushed down to the data collection system 202 (i.e., trace configuration 226). A trace configuration 184 identifies particular parameters, sensor input, metrics, and other information to be included in a set of session data. Based on the trace configuration 184, the data collection system 202 can, in some instances, filter out input or otherwise process, e.g. aggregate, compress, based on trace configuration 184 received via the various interfaces 214, 217, thereby removing or reducing the non-required data from the data set. The trace configuration 184 can also include definitions of start and end conditions that would be used by the data collection system 202 for cutting contextualization. When those conditions are met, the cutting process can react accordingly. In some instances, the trace configuration 184 may be pushed down to the automation system 302 and/or particular machines 370, sensors 375, and data sources 380 such that non-required data either is not generated or not passed upward to through the system 100. The trace configuration module 160 allows users to define the particular parameters, metrics, and other data to be captured and included. In some instances, if no particular modifications are defined, the trace configuration 184 may define a default set of data and metrics to collect. Should additional or less information be needed, the user can interact with the trace configuration module 160 to modify the desired data set, with changes being passed to the various components managing the collection and/or processing of relevant data.

The online trace runtime manager 163 can manage the receipt, ingestion, and processing of data from the data collection system 202. In some instances, the online trace runtime manager 163 may be associated with one or more REST-based APIs to which information from the data collection system 202 can send session information. As data is received, the online trace runtime manager 163 can receive and store the data in real time or as it is received. If some instances where the data is received in a piecemeal fashion, the online trace runtime manager 163 can store the data in a buffer before receiving the end of the session, where the data can then be stored. Alternatively, the data can be stored by the online trace runtime manager 163 as it arrives, with sessions being closed upon receipt of the end event data. In some instances, the online trace runtime manager 163 can perform filtering out of data outside the trace configuration 184 where no other filtering has been performed within the system (e.g., where the data collection system 202 does not act upon a particular trace configuration 226 and merely collects and contextualizes all data received from the automation systems 302.

Figure 4A:
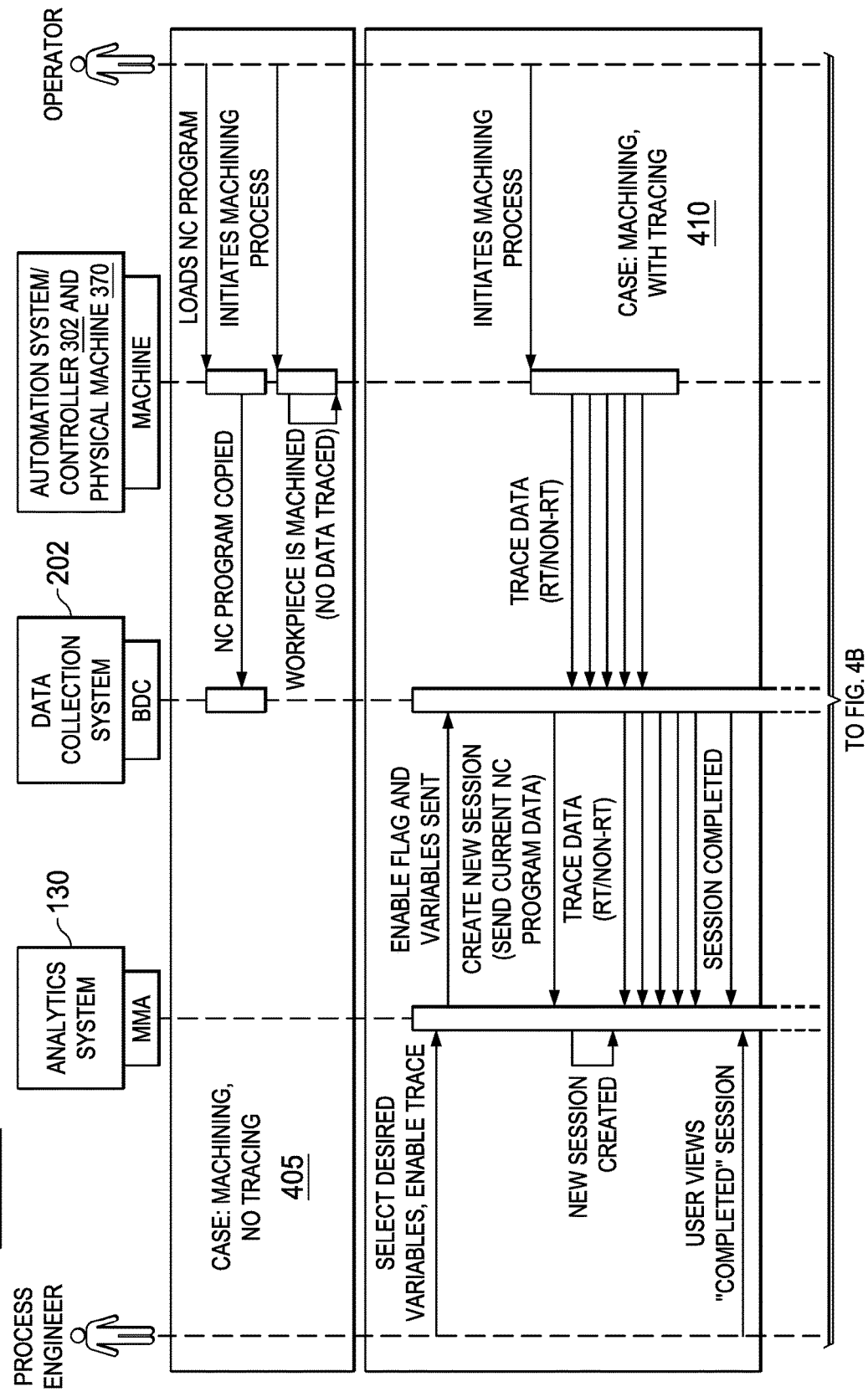
FIGS. 4A-4B are a swimlane diagram illustration of three example tracing scenarios.
Figure 4B:
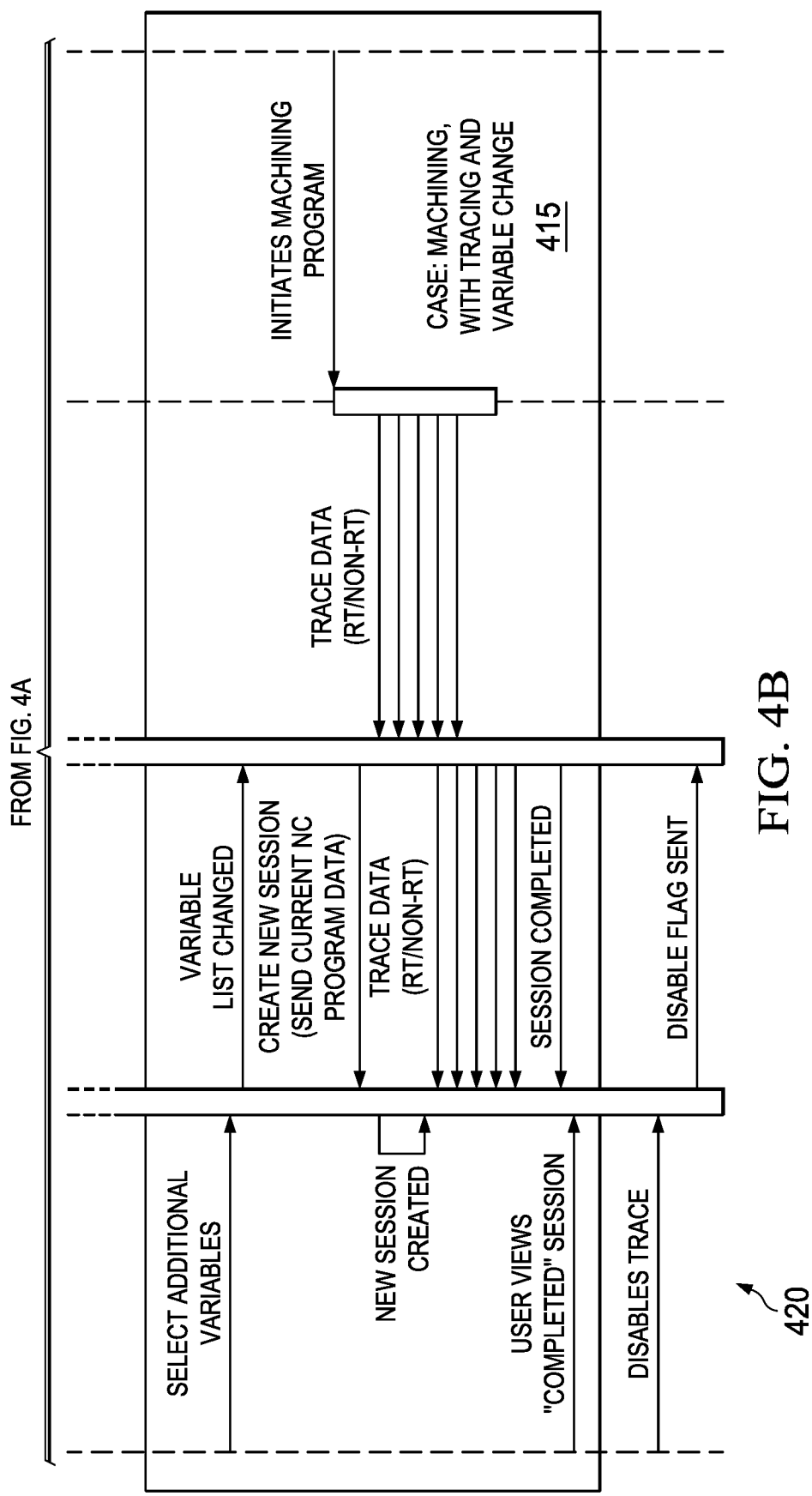

FIGS. 4A-4B illustrate three tracing examples—a first scenario where no tracing is performed (405), a second where a first set of variables and parameters are traced based on a user's selection (410), and a third where an updated set of variables and parameters are selected based on an updated selection (415). In scenario 405, a manufacturing process is performed without tracing. A local operator of the physical machine 370 can initiate the process by loading a particular instruction set, e.g. NC program (e.g., selecting an existing program that has been previously loaded into the memory of the machine, or by loading and activating a new program either via USB storage media, or other method.). The NC program may be copied at this time to the data collection system 202 prior to the start of manufacturing, or may be copied at the start, during, or end of manufacturing. The operator would initiate the machine process (e.g. by pressing the "Start" button on machine interface, causing the manufacturing process to initiate. The workpiece is then manufactured, but with no data being traced. Upon completion, no data associated with the session is traced or recorded.

In scenario 410, a process engineer, via the analytics system 130, can identify a set of desired variables and parameters to be traced (i.e., a particular trace configuration) and can enable the tracing via the trace configuration module 160. The analytics system 130 can provide the trace configuration to the data collection system 202 which activates the tracing process and begins capturing data as the manufacturing process is initialized again by the local operator. As the system executes, trace data is received by the data collection system 202 and is managed and contextualized based on the counter value associated with the particular real time and non-real time data. As the process begins, the data collection system 202 can provide information regarding the new session to the analytics system 130 in preparation for capturing and transformation of the data. A new session is created by the analytics system 130, and as information is received from the data collection system 202, the data is transformed and associated based on the data's spatial characteristics. Additional data is associated with the captured data and, upon completion of the process, the session is completed. The process engineer or another user is then able to access and interact with the data from the completed session.

In scenario 415, additional or alternative variables can be identified by the process engineer and subsequently passed down to the data collection system 202 via the updated trace configuration. The data collection system 202 updates what is relevant to the current process, and can perform a similar process as scenario 410 for creating a new session at the analytics system 130 and associating traced data based on the counter values. Again, upon completion of the session, the session can be completed and the user can view the completed session.

At 420, the process engineer may determine no further tracing is needed. In response to the indication, the analytics system 130 can notify the data collection system 202 to disable further tracing. If future processes are initiated, the data collection system 202 can ignore the data similar to scenario 405.

The illustrated flows of FIGS. 4A-4B are merely one example set of operations for the tracing and manufacturing processes. In addition to human actors initiating the illustrated flows, these flows can also be initiated by components of the system, e.g. agents, workflow engines. For example, one instance not depicted is the user accessing the session while it is in progress, as well as making changes to the trace configuration while a particular manufacturing process is executed. Other such implementations are possible and contemplated by the present disclosure.

The analytics system 130 further includes a set of visualization and UI logic 164 that allows users to view and interact with the various sets of session data. The set of visualization and UI logic 164 can provide the functionality associated with several of the solutions previously mentioned and later described in this disclosure, in particular the 3D visualization of the session data, the presentation of 2D metric data integrated within the 3D visualization of the session data, the four-way interaction of related data presentations, and pattern-based benchmarking. The visualization and UI logic 164 is capable of accessing particular sessions or groups of sessions and visualizing the corresponding session data to users.

In an example 3D visualization, the visualization and UI logic 164 can access a set of session data and present, e.g., in an animated presentation, a visualization of an actual path taken and/or expected path expected to be taken by a tool of the physical machine 370. The visualization may present the entirety of the path taken or expected to be taken based on the transformed data 172 generated at the analytics application 139 by the kinematic transformation module 151. If both the actual and expected data related to the path is shown, different colors may be used to differentiate between the two paths. In some instances, a CAD-based image of the particular workpiece being manufactured (e.g., milled, drilled, machined, welded, etc.) may be presented along with the visualized path or paths. To do so, the actual and expected paths and data can be transformed into a common coordinate system, and the CAD image can be transformed as well into the same common coordinate system. In some instances, the coordinate system of the CAD image may be the same as the common coordinate system such that no transformation is required for the CAD image data. The visualized paths can show the actions taken or expected to be taken by the machine 370 as the session operated. Based on particular calculations (e.g., the contouring error calculation) and thresholds specified (either automatically determined or user-defined), particular portions of the paths taken can be identified as critical regions where the calculated values exceed those thresholds resulting in a critical region being determined. In some instances, raw data or metrics may be used to identify critical regions. For example, where a vibration amount or temperature level is exceeded based on sensor data, a critical region may be determined. Based on the contextual link to the actual and/or expected path data, the metric values identifying the critical region can be used to determine portions of the paths taken and/or the associated sets of instructions (e.g., particular lines in the NC program 175) where the critical region is associated, which can then be shown within the 3D visualization.

Figure 7:
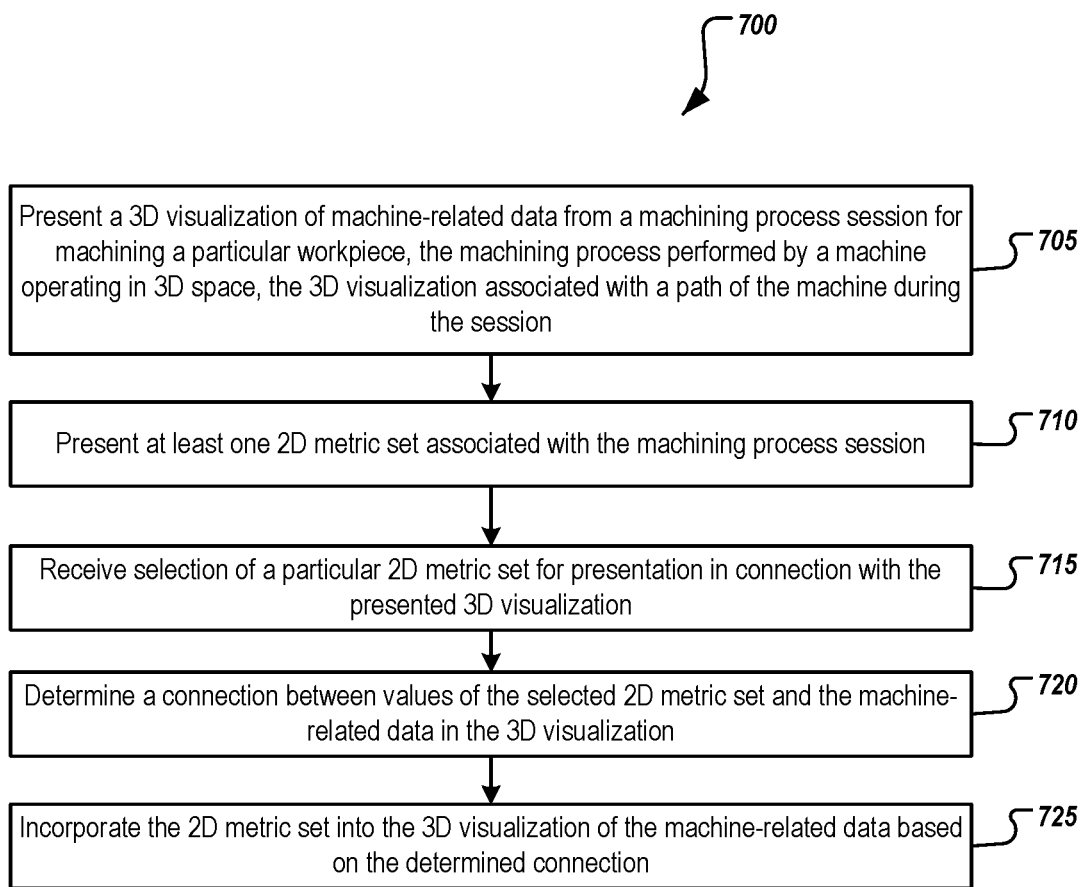
FIG. 7 illustrates a flowchart of an example process for displaying two-dimensional (2D) metric data associated with a three-dimensional (3D) visualization of a manufacturing process session onto the 3D visualization.
Figure 8:
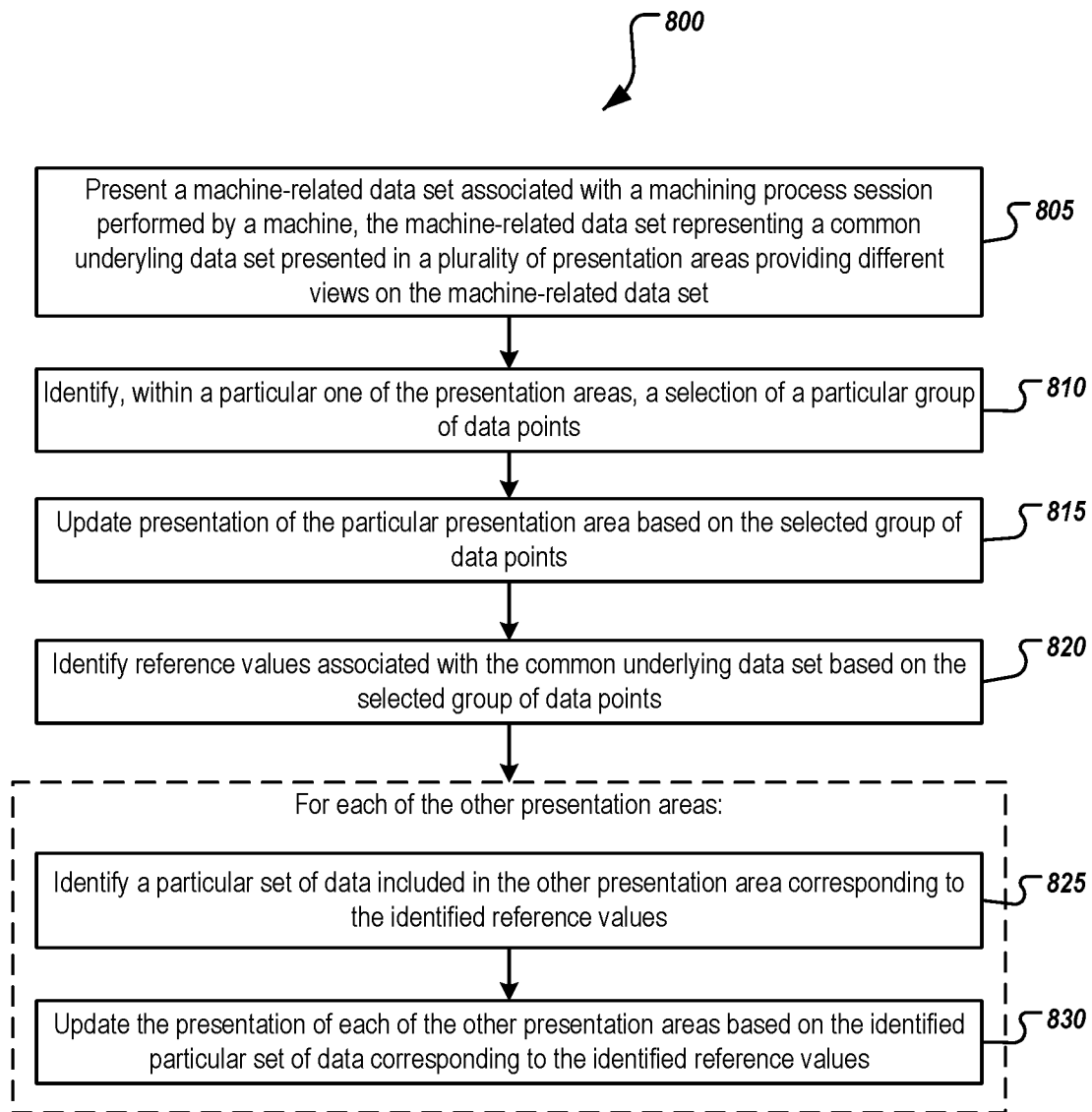
FIG. 8 illustrates a flowchart of an example process for providing a multiple window or presentation area presentation of different views on a common underlying set of data associated with a manufacturing process session.
Figure 9:
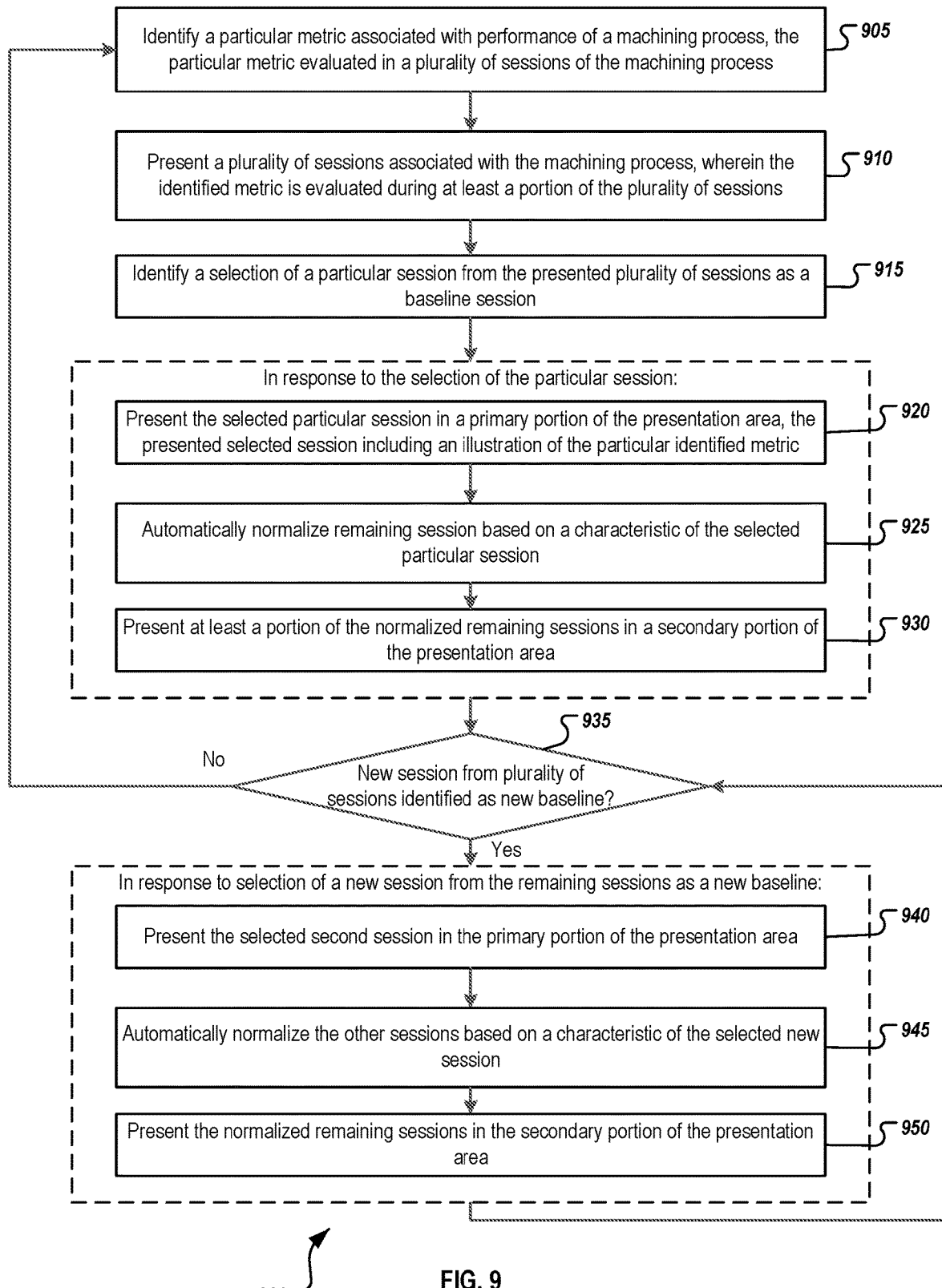
FIG. 9 illustrates a flowchart of an example process for performing a pattern-based benchmarking process based on various metrics measured and/or calculated during various manufacturing process sessions.

The visualization and UI logic 164 for the presentation of 2D metric data integrated within the 3D visualization of the session data, the four-way interaction of related data presentations, and the pattern-based benchmarking can provide the additional connections and functionality described in FIGS. 7, 8, and 9, along with the other example illustrations.

The analytics-based monitor and control system 130 may be a cloud-based system, a local server at a customer location, a remotely accessible server or system, or any other appropriate system. In any event, the analytics system 130 and its functionality can be accessible to one or more clients 105 communicably coupled to the analytics system 130. In some instances, the client 105 may be associated with one or more process engineers or other suitable users 102, as well as any other suitable users or administrators.

As illustrated, one or more clients 105 may be present in the example system 100. Each client 105 may interact with the analytics-based monitor and control system 130 via network 190, such as through the MMA application 114 or any other suitable client application. Multiple clients 105 may interact with and access the functionality of the analytics system 130. In some instances, the client 105 may access similar sessions associated with a particular machine 370 and its related sensors, while in others different clients 105 can access data related to sessions of different machines 370 at the same time. Each client 105 may include an interface 108 for communication (similar to or different from interfaces 133, 205, 305), a processor 111 (similar to or different from processors 136, 208, 308), the MMA (or client) application 114, memory 120 (similar to or different from memory 166, 223, and 350), and a graphical user interface (GUI) 117.

The illustrated client 105 is intended to encompass any computing device such as a desktop computer, laptop/notebook computer, mobile device, smartphone, personal data assistant (PDA), tablet computing device, one or more processors within these devices, or any other suitable processing device. In general, the client 105 and its components may be adapted to execute any operating system, including Linux, UNIX, Windows, Mac OS®, Java™, Android™, or iOS. In some instances, the client 105 may comprise a computer that includes an input device, such as a keypad, touch screen, or other device(s) that can interact with the MMA application 114, and an output device that conveys information associated with the operation of the applications and their application windows to the user of the client 105. Such information may include digital data, visual information, or a GUI 117, as shown with respect to the client 105. Specifically, the client 105 may be any computing device operable to communicate queries or requests for information regarding particular sessions stored by and available at the analytics system 130, as well as communicate in some instances with other components within and outside system 100, e.g., via network 190, as well as with the network 190 itself, using a wireline or wireless connection. In general, client 105 comprises an electronic computer device operable to receive, transmit, process, and store any appropriate data associated with the environment 100 of FIGS. 1-3.

The MMA application 114 may be any suitable application executable on the client 105, including a web-based application or local client application. The MMA application 114 may be an agent of the analytics system 130 or may access information stored and managed by the analytics system 130 to interact with the stored session data. GUI 117 of the client 105 interfaces with at least a portion of the environment 100 for any suitable purpose, including generating a visual representation of the MMA application 114 and the visualizations and interactions with the session data associated with one or more manufacturing processes and physical machines 370. In particular, the GUI 117 may be used to present visual representations of the session data including illustrations of the actual and/or expected paths taken by a particular physical machine 370 or robot, illustrations of a particular workpiece being manufactured or worked on during the session, metrics and data measured during or calculated from the actions of the particular sessions, information on particular sets of instructions provided to and executed by the physical machines 370 or other machines during the session, as well as other relevant information. The GUI 117 may be used to visually present various analytical analyses and provide interactive manipulations of data from the sessions using the functionality of the MMA application 114. GUI 117 may also be used to view and interact with various Web pages, applications, and Web services located local or external to the client 105. Generally, the GUI 117 provides the user with an efficient and user-friendly presentation of data provided by or communicated within the system. The GUI 117 may comprise a plurality of customizable frames or views having interactive fields, pull-down lists, and buttons operated by the user or process engineer or other suitable users 102. For example, the GUI 117 may provide the interactive visualizations described herein that allow a user to view or interact with session data related to the operations and execution of manufacturing processes associated with the system 100. In general, the GUI 117 is often configurable, supports a combination of tables and graphs (bar, line, pie, status dials, etc.), and is able to build real-time portals, application windows, and presentations. Therefore, the GUI 117 contemplates any suitable graphical user interface, such as a combination of a generic web browser, a web-enable application, intelligent engine, and command line interface (CLI) that processes information in the platform and efficiently presents the results to the user visually.

While portions of the elements illustrated in FIGS. 1-3 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

FIG. 7 illustrates an example process for displaying two-dimensional (2D) metric data associated with a three-dimensional (3D) visualization of a manufacturing process session onto the 3D visualization. For clarity of presentation, the description that follows generally describes method 700 in the context of the system 100 illustrated in FIGS. 1-3. However, it will be understood that method 700 may be performed, for example, by any other suitable system, environment, software, and hardware, or a combination of systems, environments, software, and hardware as appropriate.

As described previously, one or more two-dimensional (2D) sets of data associated with the various calculations and/or measurements may be available to provide additional information, context, and issue recognition capabilities to the user. In previous solutions, such presentations were provided separately from a 3D visualization of a machine's tool path traveled during the manufacturing process session. In other words, a first window may present a 3D visualization of the machine's tool path during the process, while another separate window may provide information on one or more metrics measured during the process. The metrics may be calculated metrics, such as a contouring error determined based on a percentage difference from an actual path taken by the machine and an expected path on which the machine was instructed to take, as well as parameters or other sensor-based data identified during the process (e.g., temperature, electrical pulses, vibration, velocity, jitter, or any other suitable signal or parameter). Manual comparisons and analysis comparing the 3D visualization and the 2D metrics are time consuming. The described solution here therefore allows 2D metric data to be rendered on the 3D visualization within the same window and presentation of machine-related data. In providing the connection, the portions of a path taken by the machine can be identified in connection with areas where potential critical areas are determined based on the 2D metrics. Distinguishing or highlighted presentations of the 2D metric values and the areas along the path traveled within the 3D visualization window or presentation area can allow for immediate recognition of impacted area. In FIG. 7, an example process for presenting 2D metrics within and in association with the 3D visualization are provided.

At 705, a 3D visualization of machine-related data obtained from a manufacturing process session for a particular workpiece is presented. The 3D visualization is associated with a traveled tool path during the manufacturing process, where the tool path is traversed by the machine operating in 3D space for manufacturing the workpiece. In some instances, the path of the tool visualized is the actual path of the tool traveled (or a particular component or part of the machine) during the session, while in others the path of the tool visualized is an expected path to be traveled by the tool during the manufacturing session. The tool path can be determined based on the expected values from the controller, which are determined by the controller based on the set of instructions, e.g. NC code provided to the machine. In some instances, the tool path may be purely derived from the instructions themselves, or they may be determined by the controller after providing the instructions to the machine.

At 710, at least one 2D metric data set associated with the manufacturing process session can be presented within the same user interface as the 3D visualization. Where the 3D visualization is presented in a first presentation area or window of the user interface, the 2D metric data sets are presented in a second presentation area or window of the UI separate from the first presentation area or window of the user interface. The 2D metric data sets may be metric values evaluated over a period of time occurring during the manufacturing process session. In some instances, the 2D metric data sets may be observed or calculated data as obtained by one or more sensors of or associated with the machine, while in others, the 2D metric data sets may be calculated values based on the actual path traveled by the machine during the session, the expected path to be traveled by the machine during the session, or a comparison between the actual path traveled by the machine and the expected path to be traveled by the machine during the session (e.g., the contouring error). Any suitable metric can be presented associated with the manufacturing process session, the machine, or sensors and other data associated with the process. In some instances, the 2D metric data sets may be presented prior to the presentation of the 3D visualization, such as when 2D metric data sets for a plurality of different manufacturing sessions are available. In such instances, a corresponding visualization may be presented only after a particular 2D metric data set is selected.

At 715, a selection of a particular 2D metric data set is received, where the selection is an indication that the selected 2D metric data set is requested to be presented in connection with the presented 3D visualization.

At 720, a connection between values of the selected 2D metric set and the machine-related data associated with the 3D visualization is determined. In some instances, the machine-related data associated with the 3D visualization may be associated with time references for points along the path traveled by the machine. In other instances, the machine-related data associated with the 3D visualization may be associated with particular distances traveled by the machine or a portion of the machine during the manufacturing process session. In other instances, a spatial location associated with the both the 2D metric set and the data of the 3D visualization may be used to connect the information. Similarly, the 2D metric set is a two-dimensional data set associated with a metric value and a time, a distance traveled, or another similar second dimension. The connection between the 2D metric set and the machine-related data can be determined based on a connection between the times of the values of the metric set and a time at which the machine was at a particular location, or between a distance traveled by the machine in the machine-related data and a distance traveled within the 2D metric set. In instances where the 2D metric represents a calculation derived from the machine-related data, the connection is based on the comparison between the known similar timing or distance-traveled values of the two sets of data.

Once the connection is determined, the 2D metric set is incorporated into the 3D visualization of the machine-related data based on the determined connection between the two data sets. Based on the connection, the values of the 2D metric set can be presented in a 2D format on top of the 3D visualization based on the points in common, based on the time of the 3D visualization matching the 2D value, or based on a common distance traveled for part of the 3D visualization matching the time traveled for corresponding to a particular 2D value in the 2D metric set.

In some instances, a CAD-based visualization of the workpiece being manufactured or otherwise worked on by the manufacturing process may be incorporated into the 3D visualization, either before or after the selection of the particular 2D metric. The CAD visualization of the workpiece may be presented at a particular rotation or angle. In some instances, the angle of presentation of the 2D metric set in the 3D visualization may be based on an angle or orientation of presentation of the CAD visualization of the workpiece. In some instances, the angle or orientation of the 2D metric set may match the angle or orientation of the tool or element of the machine as reference. The angle or orientation may be varying and different throughout the 2D metric set. Further, the presentation of the 2D metric set may, after being incorporated to the 3D visualization, rotate in connection with any rotation of the workpiece.

In some instances, particularly where the values of the 2D metric set vary widely, the size of the values from the 2D metric set may be presented in a reduced scale to better fit within the 3D visualization. The reduced scale may be a uniform reduction to every value of the 2D metric set, while in others a logarithmic or non-uniform suitable scaling used to present the relative values of the metric at different times without requiring an exact scale.

In some instances, only a portion of a 2D metric set may be presented in connection with the 3D visualization. In some instances, the 2D metric set may have one or more ranges of values falling in a critical region based on a pre-determined, default, or dynamically-determined threshold value indicating a potential issue with the manufacturing process. In some instances, incorporating the 2D metric set into the 3D visualization may include only incorporating portions of the 2D metric set associated with a critical region. In some instances, users may toggle whether to present the entirety of the 2D metric set or a portion thereof, as well as to define particular time ranges or distances traveled in which the 2D metric is to be shown.

Depending on the type of 2D metric, positive and negative values may be possible. Negative values can be presented in any suitable manner, including drawn opposite the positive angle or orientation. In other instances, negative values can be drawn at the same angle or orientation as positive values but with a differentiator indicating the negative aspect of the value, including a different color or shading.

FIG. 8 illustrates an example process for providing a multiple window or presentation area presentation of different views on a common underlying set of data associated with a manufacturing process session. For clarity of presentation, the description that follows generally describes method 800 in the context of the system 100 illustrated in FIGS. 1-3. However, it will be understood that method 800 may be performed, for example, by any other suitable system, environment, software, and hardware, or a combination of systems, environments, software, and hardware as appropriate.

In some instances, the solution described in relation to FIG. 8 is called a four-way interaction based on a common implementation having four different windows. However, any number of windows or presentation areas may be used, as appropriate. References to the solution as "four-way interaction" are not meant to be limiting, but describe a particular example implementation. Specifically, the interaction described may be an n-way interaction, where n is an integer of 2 or more. The objective of four-way interaction is to help users navigate massive amounts of data that are otherwise impossible to analyze, by helping them narrow down to a specific problem area across presentations of different views on the common underlying data set. The solution provides four different interconnected user interface controls that are available to view and analyze different parameters and navigate portions of time and distance traveled by the machine to get insights from the machine-related data which would otherwise have to be manually pulled from historical data.

Specifically, the four-way interaction is enabled through the presentation of separate, but connected, selectable presentation areas. In one implementation, the solution may provide the four presentation areas comprising a time slider, an NC code (or, more generally, a set of instructions executed by the machine) selection box, an interactive 3D visualization illustrating the path taken by the tool during the manufacturing process session, and a 2D metric chart region providing calculations and other detected or calculated parameters over time.

The data presented in each of the presentation areas is related to and/or connected to one other and the underlying data set of the machine-related data, where each point of the underlying data set is linked based on inherent or external data connections. For example, the path traveled by the tool of the machine may be associated with location information, a distance traveled by the tool, and a time at which the machine was at different positions. Similarly, the set of instructions executed by the machine may be associated with a reference value, such as a time at which a particular instruction was executed. The 2D metrics for various parameters and metrics may be associated with a distance traveled, a time, or another reference value, such as a spatial reference. In some instances, the reference values may not be explicitly defined within the data, but instead defined in metadata associated with the particular data. An example may be the set of instructions, where the instructions themselves are not explicitly associated with a time of execution. Instead, a set of metadata may be generated during the data ingestion process to associated a particular time of execution associated with different instructions or lines of instruction. Based on their connection to the underlying common data set, changes to particular presentation areas can be matched or connected to a particular reference point or range of reference points, which can then be connected to the other presentation areas.

The time slider presentation area allows users to slide or adjust each end of an interactive time slider to view portions of time within a particular manufacturing process session. In some instances, as the user interacts with the slider (which may be of any type or format, including analog or digital), a tool tip or other indication can display the exact times at which the slider is positioned. When a particular period of time is selected, the period is matched to the other presentation areas to automatically update and select information from those presentation areas corresponding to the selected time period. In some instances, the 3D visualization may be rendered and/or zoomed to reflect the portions of the machine path traveled during the selected time period, while the set of instructions selection box presents or otherwise distinguishes the particular instructions executed during the selected time period. Any presented 2D metric charts may be updated to limit their presentation to the selected time period, or may highlight or otherwise emphasize the values associated with the time period.

The set of instructions selection area provides an interactive listing of the particular instructions provided to or executed by the machine during the manufacturing process session. The set of instructions selection area allows users to click on or select an instruction or selected set of (sequential or non-sequential) instructions to focus upon. The selected instructions may be associated with a particular action or a particular time at which the instructions were executed. Based on the selection, a corresponding reference value linking the instructions to the common underlying data set can be identified (e.g., based on an explicit timing, distance traveled, action performed, etc.). Data in the 3D visualization and the 2D metrics can be updated to correspond to (e.g., to emphasize the related data or to focus the presentation on) information within the presentation area corresponding to the reference values of the selected instructions. The time slider may also be updated to correspond to the times or range of times associated with the selected instructions.

The 3D visualization presentation area provides an illustration of the path traveled by the machine during the manufacturing process session (e.g., an actual path traveled or a path as expected to be traveled based on the instructions executed by the machine). In some instances, a CAD-based (or other) image of the workpiece being manufactured can be presented in the 3D visualization showing how the path relates to the manufactured workpiece. By interacting with the 3D visualization, users can identify particular portions of the path traveled, or particular portions of the workpiece, for further investigation or information. In some instances, zooming in the 3D visualization may trigger an update to the other presentation areas based on the area zoomed in on (e.g., identifying the distances traveled and/or the time period associated with the paths traveled). In some instances, a selection interaction may select a radial selection associated with an area of the workpiece. In such a selection, non-sequential sets of path data may be selected, such that the ranges of reference points are also not sequential. In those instances, non-sequential sets of corresponding data in other presentation areas may be selected or presented matching those selected in the 3D visualization.

As previously described, the systems herein may identify one or more critical regions based on various thresholds manually defined by users, dynamically defined as data is received, and set as defaults within the system. In some instances, the thresholds may be evaluated in relation to a particular metric, such as a contouring error, calculated based on a comparison of an actual and expected path of the machine. In other instances, particular characteristics or measured values or calculated values associated with the execution of the machine may define when a critical region is detected. Because the presentation areas are connected to the common underlying data set, a critical area determined in a particular presentation area or associated with a particular data set included in the presentation area can be visualized in one or more of the other presentation areas. For example, where a contouring error exceeds a particular threshold, resulting in a critical region that is presented in the 2D metric chart region, the critical region can be identified for a particular range of time, a distance traveled, or at individual locations where the critical region occurs. Those critical regions can be identified and matched to a group of data points, which can then be matched to one or more reference values associated with the common underlying data set. Based on those reference values, the corresponding portions of the other presentation areas can be identified which correspond to the identified critical regions, thereby providing information to the user about which parts of the other presentations are part of those critical regions.

Returning to FIG. 8, at 805 a machine-related data set associated with a manufacturing process session performed by a machine (e.g., physical machine 370) is presented. The machine-related data-set represents a common underlying data set describing the manufacturing process and presented in a plurality of presentation areas, each presentation area providing a different view associated with the machine-related data set. As previously described, the common underlying data set of the machine-related data set may be collected from various sources, including the physical machine, sensors monitoring or associated with the manufacturing process, and/or one or more data sources. Portions of the data may be stored together or separately, but is otherwise linked or provided reference to some or all of the other related data, such as by a time- or location-based reference point. For example, different presentations of the data may be associated with different data connected to the manufacturing process, such as a path traveled by the machine (e.g., an actual path and/or a path expected to be traveled by a tool or end-effector of the physical machine based on the instructions executed by the machine, or both), a set of instructions executed by the machine, one or more metrics associated with the manufacturing process session (e.g., monitored metrics/parameters and/or calculated or derived metrics based on the monitored data), and a time slider associated with a reference time value of the session. As described, the data presented in each of the presentation areas can be connected to the machine-related data based on anchor or reference points, such as a distance traveled or a particular time associated with the data.

At 810, a selection of a particular group of data points within a particular one of the presentation areas is identified. The selection may be of a particular spatial area in a 3D visualization of the path traveled, a particular instruction or set of instructions, a particular portion of a 2D metric, or a particular range in a time slider, among others. At 815, based on the selected group of data points, the particular presentation area is updated, if necessary, based on the selected group of data points. In some instances, the update may include a modification to the presentation, including an indication of a particular selection (e.g., highlighting or other distinction of the selected group of data points) or a zooming in or other resizing of data within the presentation area.

At 820, reference values associated with the machine-related data set are identified based on the selected group of data points. The reference values may be any particular value shared or linking the various data sets in the presentation areas, including time values associated with the selected group of data points, particular locations or distances traveled associated with the data points, or another suitable reference value. By identifying the reference values, corresponding groups of data in the other presentation areas may be located or identified.

Operations 825 and 830 are performed for each of the other presentation areas in the overall presentation. At 825, particular sets of data included in each of the other presentation areas corresponding to the identified reference values are identified. At 830, each of the presentation areas are updated based on the identified particular sets of data corresponding to the identified reference values. In other words, groups of data points in each of the other presentation areas are determined based on their underlying link or associated connection to the initially selected group of data points.

In some instances, the operations of FIG. 8 may be performed based on a selection of a particular critical region illustrated in a particular visualization within one or more of the presentation areas. In such instances, a user interaction with a particular critical region indication (e.g., a highlighted portion of the data associated with the critical region) can initiate the selection and updating process. In others, a determination that a critical region or regions exist in one presentation area can automatically initiate the operations of method 800.

FIG. 9 illustrates an example process for performing a pattern-based benchmarking process based on various metrics measured and/or calculated during various manufacturing process sessions. For clarity of presentation, the description that follows generally describes method 900 in the context of the system 100 illustrated in FIGS. 1-3. However, it will be understood that method 900 may be performed, for example, by any other suitable system, environment, software, and hardware, or a combination of systems, environments, software, and hardware as appropriate.

Pattern-based benchmarking allows users (or the system, performing the process automatically without user interaction) to compare, relatively, a plurality of sessions associated with similar workpiece processes. In some instances, the sessions may be associated with a single machine or combination of machines performing a particular manufacturing process in various sessions. In some instances, the sessions may be performed by different machines each performing a particular manufacturing process related to the same workpiece. In other instances, the sessions may be performed by machines performing different processes related to the same or different workpieces. Pattern-based benchmarking allows users to visually compare data from multiple sessions of production and, in some cases, to identify ideal or preferred configurations of parameters and/or processes based on the comparison. Further, patterns of errors may be identified, as well as ideal sessions to emulate or otherwise learn from as relatively better for future manufacturing processes.

Specifically, pattern-based benchmarking allows users to compare multiple sessions of production side-by-side or top-to-bottom, to easily identify patterns of error. The design visualizes data from each session in the form of a related domain, such as timeline or tool travel distance for the user to analyze in comparison. If critical regions are associated with portions of particular sessions, that information may be presented within the presentation. Sessions with fewer critical regions may be preferred baseline sessions, and can be used to compare to other sessions associated with additional critical regions. Critical regions can be presented in a distinguished or highlighted manner across the sessions for easy and fast comparison, and information about particular sessions can be identified to determine what may be causing the critical regions to occur.

A plurality of sessions may be provided, where each session has been evaluated for variations of particular metric. Users are able to select a particular session from the plurality of sessions as the baseline session, and a comparison for at least some of the other session in the plurality is generated relative to the selected session. In some instances, in response to setting a particular session as the baseline session, additional information specific to the selected session may be presented, e.g., as a pop-up window or in a details area. In some instances, information about other parameters associated with the session may be condensed or shown via alternative indicators, such as errors, critical regions, and other areas of interest. Other sessions may be presented in a reduced or partial manner, with areas of interest shown via reduced or alternative indicators as well. By selecting a particular one of the other sessions, users may expand particular session's timeline (or other suitable axis) in an accordion-like or expanding manner to access more detailed information regarding that session, for example, specific values or illustrations of a line graph associated with the data, details about particular areas where critical region thresholds are exceeding, time and/or distance traveled information, as well as other information.

Interactions with the baseline session may also be propagated through to the others in the plurality of sessions. The pattern-based benchmarking can be used to compare execution as compared to particular thresholds that have been set in connection with at least one of the session data. For example, if a particular contouring error threshold is set in a first session selected as the benchmark baseline, the threshold can be propagated down to the remaining sessions and used to evaluate a relative execution such that the threshold is reflected in each of the plurality of sessions.

Turning to FIG. 9, a plurality of metrics associated with machine execution that are generated during a plurality of manufacturing process sessions may be available for selection or further analytical review. The metrics may be a measured parameter, input, or output monitored during a particular session, or may be a calculated or otherwise derived value generated based on one or more parameters, inputs, or outputs monitored during the particular session. Examples of metrics may include velocity of the machine (or a component thereof) during the session, a contouring error at a particular time or distance traveled, a temperature level of a particular component or tool during the session, sound emitted during the session, or any other suitable metric evaluated during at least some of the sessions. The metrics may be associated with in a two-dimensional presentation, where the X-axis of the presentation represents a time during the session or a distance traveled during the session and where the Y-axis of the presentation represents a value (absolute or relative) of the particular metric. At 905, a particular metric from the plurality of metrics may be identified, where at least a portion of the plurality of sessions are associated with the particular metric or have had the particular metric measured, monitored, calculated, or otherwise evaluated. In some instances, not all sessions may be associated with a particular metric, such as where a trace configuration applied at the time does not include the particular metric.

At 910, a plurality of sessions associated with the manufacturing process and associated with the identified metric are presented. In some instances, the sessions may be presented in a new presentation area or window with two or more panes or areas. In other instances, the plurality of sessions may be presented in one presentation area of a larger presentation area that includes 3D visualizations associated with a manufacturing process, a time slider, and/or other visualizations. In some instances, one or more of the sessions may represent an average or combination of one or more other sessions. For example, a particular session may represent an average of all sessions associated with the metric, such that the values within the particular represent an average value at each time or location throughout the metric.

At 915, a selection of a particular session from the plurality of sessions is identified, where the selection results in the particular session being used as a baseline session. The particular session may be selected based on user input or may be automatically identified based on an evaluated relative quality or inferiority. In some instances, an average or median session may be calculated and automatically selected as the baseline session. In other instances, an evaluated best or worst session relative to the identified metric may be determined and automatically selected as the baseline session.

In response to the selection of the particular session as the baseline session, several operations are performed. At 920, the selected particular session can be presented in a primary portion of the presentation area, such as a top area of the presentation area reserved for a baseline session's presentation. At 925, the remaining sessions in the plurality of sessions associated with the metric can be normalized based on a characteristic of the selected particular session. For example, the selected particular session may have taken a particular length of time to complete. The other sessions associated with the metric may have taken a longer or shorter time to complete. To compare those times, a normalization process may be performed to compress or expand the presentation of those other processes, as necessary, to match the selected particular session's length of time. In addition to time, for similar processes being performed, a distance traveled may be used to normalize the remaining sessions. Normalization may also be based on spatial reference to the workpiece, among others. In other implementations, normalization may be optional and/or triggered via user request. If one or more of the other sessions are completed in shorter or longer periods than the particular selected session, the differences in time periods may remain when the other sessions are presented. Normalization may be performed on the x-axis of the 2D metric or on the y-axis of the 2D metric, as appropriate.

At 930, at least a portion of the normalized remaining sessions are presented in a secondary portion of the presentation area. The secondary portion of the presentation area may be dedicated area below or near the primary portion of the presentation area. In some instances, the presentation of the particular selected session may be provided in a first level of detail, while the one or more other sessions presented in the secondary area are provided in a second level of detail, the second level of detail relatively lower than the first level of detail. For example, the primary portion of the presentation area may provide a larger presentation of the data with additional points of interest and data, additional indices or indications of values, and, in some instances, additional information or context. The secondary portion of the presentation area may present a condensed or reduced size illustration of the presented remaining sessions.

In some instances, one or more critical region thresholds may be defined for the baseline session, or for each of the sessions associated with the identified metric. The critical region threshold may define particular values of the identified metric where, if the value of the metric exceeds (or, if appropriate, falls below) the threshold, a critical region is identified. In some instances, multiple thresholds may be included or part of each evaluation. The critical region, as described, may be associated with potential issues with the process, the machine, and/or the workpiece being manufactured. If one or more thresholds are defined for the baseline session, the thresholds may also be propagated to and used to assess critical regions for each of the presented remaining sessions, such that the presentations of the remaining sessions include an indication of one or more critical regions.

The process of selecting a particular baseline session can be dynamic and iterative. As such, at 935 a determination is made as to whether a new session from the plurality of sessions associated with the identified metric is identified as a new baseline session. Any number of iterations may be performed, allowing for consideration and testing of different sessions as the baseline session for a particular metric. If a new session is identified as the new baseline, method 900 can perform operations 940 to 950 in response. At 940, the selected new session is presented in the primary portion of the presentation area. At 945, the other sessions associated with the identified metric can be normalized in a similar manner to the operations of 925. At 950, the normalized remaining sessions are presented in the secondary portion of the presentation area. Returning to 935, if it is determined that a new session is not identified, method 900 can return to 905, where a new metric associated with the manufacturing process can be identified.

In some instances, the plurality of sessions compared based on an identified metric may be based on sessions performed on different machines. For example, the same set of instructions may be provided to two or more different machines of the same model, such as in a factory setting. In theory, the operations performed by the two or more different machines should be similar based on a common set of instructions being performed. However, differences may exist based on differences in the actual operation and/or one or more external factors. Therefore, sessions associated with the different machines can be compared via the pattern-based benchmarking process. In some instances, sessions associated with particular machines may be identified or distinguished when presented allowing for quick user knowledge as to which sessions apply to which machine.

In some instances, the plurality of sessions compared based on the identified metric may be based on the same or different machines performing different instructions sets (e.g., different processes) to generate a similar underlying workpiece. In those instances, the operations may cause significant differences in particular metric values, or at least different values at different times or along different portions of a distance or path traveled by the machine. In such instances, while a direct comparison along a particular domain, such as travel distance, may be difficult, a comparison of a number or severity of critical regions associated with the different sessions can be used to compare particular sessions and therefore procedures.

FIGS. 10-14D show example presentations and screenshots of various UIs and/or portions of UIs associated with the described processes. These illustrations are for example purposes, with any number of alternative implementations being available to present the information regarding manufacturing processes.

Figure 10:
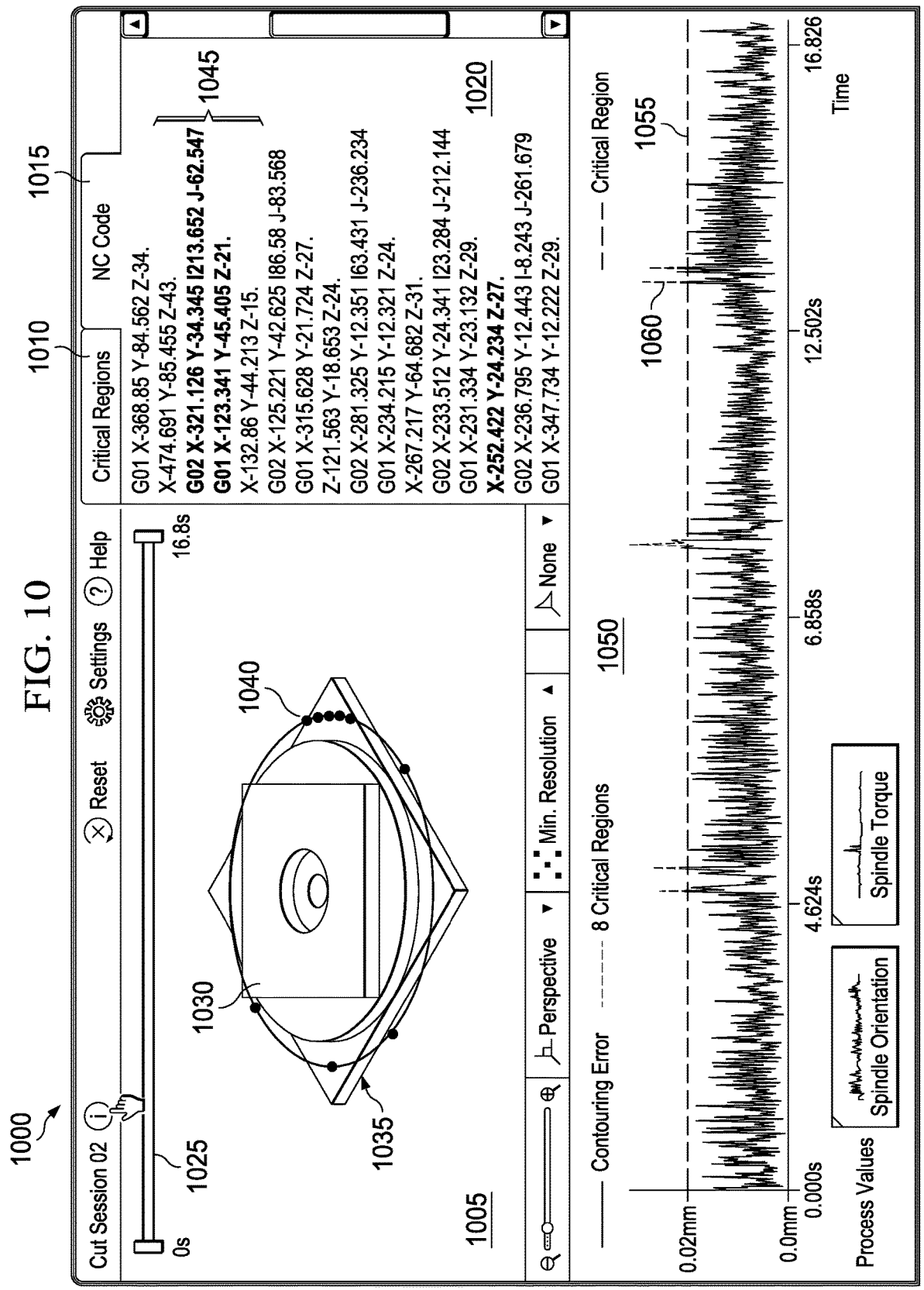
FIG. 10 presents an example view of a user interface where a 3D visualization is presented.

FIG. 10 presents an example view of a user interface 1000 where a 3D visualization is presented. In UI 1000, a 3D canvas 1005 is presented providing a visualization of a path (either actual or expected based on the executed instructions) taken by a particular machine, tool, or robot (or a part or component thereof) during the execution of the monitored manufacturing process.

As illustrated, the UI 1000 includes the 3D canvas 1005, a time slider 1025, a tab providing additional information or specific locations of one or more critical regions 1010 (shown as not activated), a tab 1015 providing a presentation of the underlying set of instructions 1020 executed during the manufacturing process (shown as activated), and a presentation area 1050 of a 2D metric measured or evaluated over the data obtained during the course of the process. The 3D canvas 1005 includes a CAD illustration of the workpiece 1035 being manufactured. The CAD illustration 1035 may be optional or toggle-able, and provides context to the operations of the machine as presented or visualized via the illustrated path 1030. The emphasized portions of the path 1040 represent locations and/or times during the manufacturing process where a critical region is detected or calculated. As described, the critical regions may be determined based on a default, user-configured, or dynamically-determined value threshold associated with one or a combination of measured or calculated metrics. If the value of the metric(s) exceeds a certain value or if the conditions defining a critical error are met, then the system can identify those parts as being a critical region. As shown in the points/regions 1040, an illustration of where on the path the critical regions are calculated can be shown with a highlighted or otherwise distinguished indication. Similarly, an indication such as the distinguishing of particular code 1045 in the set of instructions 1020 can be presented to indicate the instructions associated with a critical region.

The presentation area 1050 of the 2D metric includes an illustration of the metric values over the time during which the process was performed in the illustrated UI 1000. In other instances, the X-axis may be based on a distance traveled during the manufacturing process, a percentage of progress through the process, a particular spatial location, or any other suitable indication of a place in the manufacturing process. The line 1055 represents a determined maximum threshold for the metric. As illustrated, areas above the line may be evaluated as critical regions, with that information being shared to and presented in the other portions of the UI. The portion 1060 of the graphed metric values indicates a particular portion of the values exceeding the particular critical region threshold in the illustration. Thresholds may be static or dynamic, and be maximum or minimum thresholds, existing individually or as a combination of thresholds.

Time slider 1025 can be used to specify a particular portion of the manufacturing process session that has been traced to be illustrated, and can provide immediate information as to which portion of the session is being presented. In the current illustration, the entirety of the process session is being presented.

Figure 11:
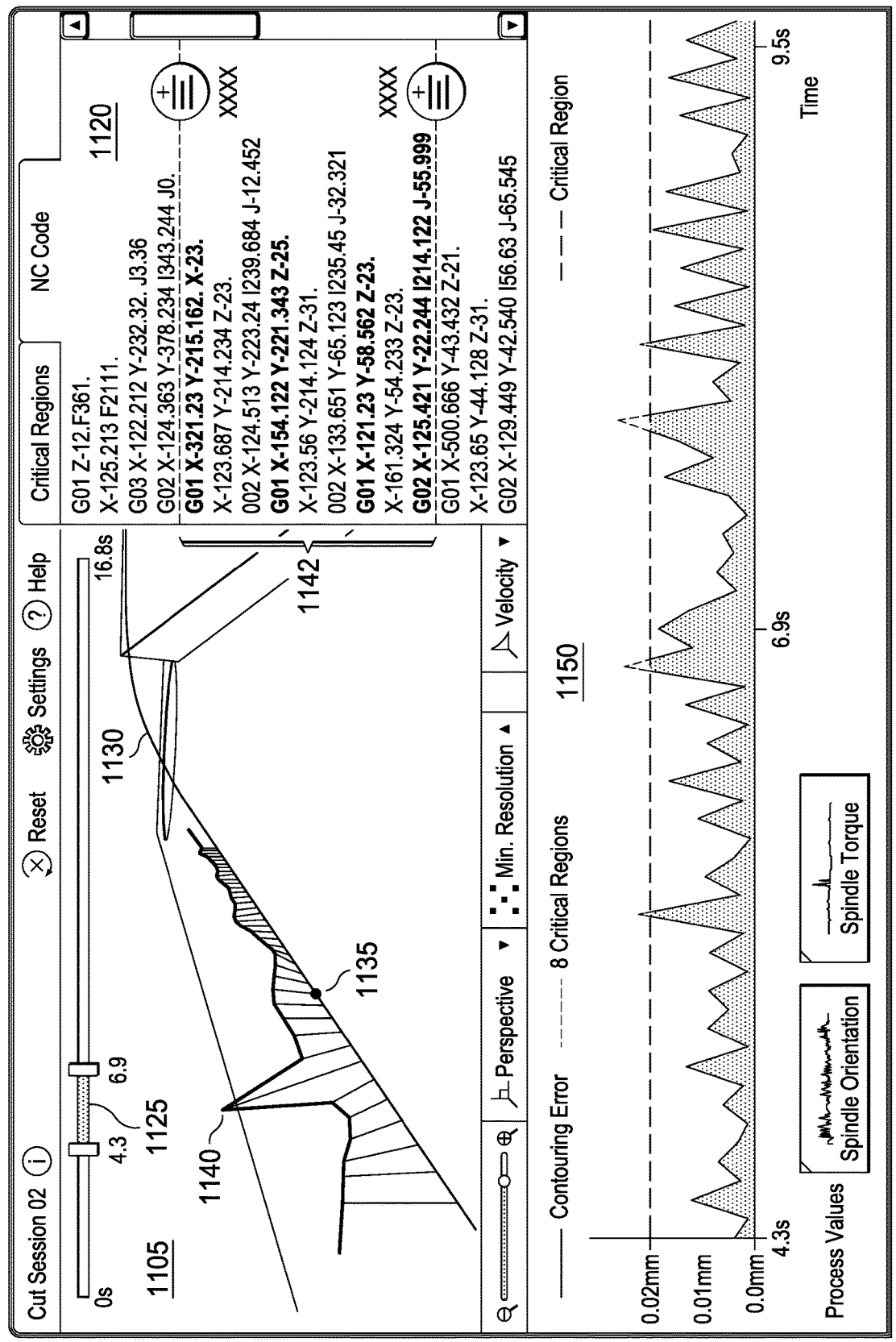
FIG. 11 presents an example illustration of a zoomed in portion of a 3D visualization.

FIG. 11 presents an illustration of a zoomed in portion of the 3D visualization presented in FIG. 10. In particular, the illustrated relates to a smaller section of the path 1130 taken by the tool and presented in the 3D canvas 1105. The selection may be made by narrowing the time slider 1125 between two times (here, between 4.3 and 6.9 seconds) within the overall time of the process, selecting or zooming in on a particular point or points on the presentation, selecting a particular set of instructions, or identifying a part of the 2D metric to view, among others. If one of the selections above is made, the other portions, using, for example, the operations described above related to the four-way interactions, selections in one or more of the other portions can be automatically made that correspond to the initial selection. As illustrated, the initial selection may be in a particular time range on the time slider 1125, where the relevant portions of the set of instructions 1120 has been selected/highlighted (portion 1142), the 2D presentation area 1150 has been updated to match the times indicated, and the visualization 1130 of the path (and the portion of the associated workpiece) have been zoomed to the appropriate regions in response to the time slider 1125 selection.

An indication has been made to request or cause a portion of the 2D metric data in the 2D metric presentation area 1150 to be presented on top of and in connection with the presentation of the path 1130 visualized. One or more critical regions 1135 have been illustrated as distinguished entries or portions on the path 1130, and the 2D presentation selected has been added to the 3D canvas 1105. As illustrated, the portion 1140 of the 2D graph incorporated into the 3D canvas 1105 is provided at a particular angle to allow for ease of viewing. In some instances, color coding or other distinguishing characteristics may be included to show where particular critical regions are on the 2D presentation portion 1140. In some instances, the actual values may be scaled to allow for a more readable presentation, as well. If the view in the 3D canvas is rotated, the 2D metric presentation portion 1140 may be rotated in connection, or may be repositioned to allow for a readable view of the data.

Figure 13A:
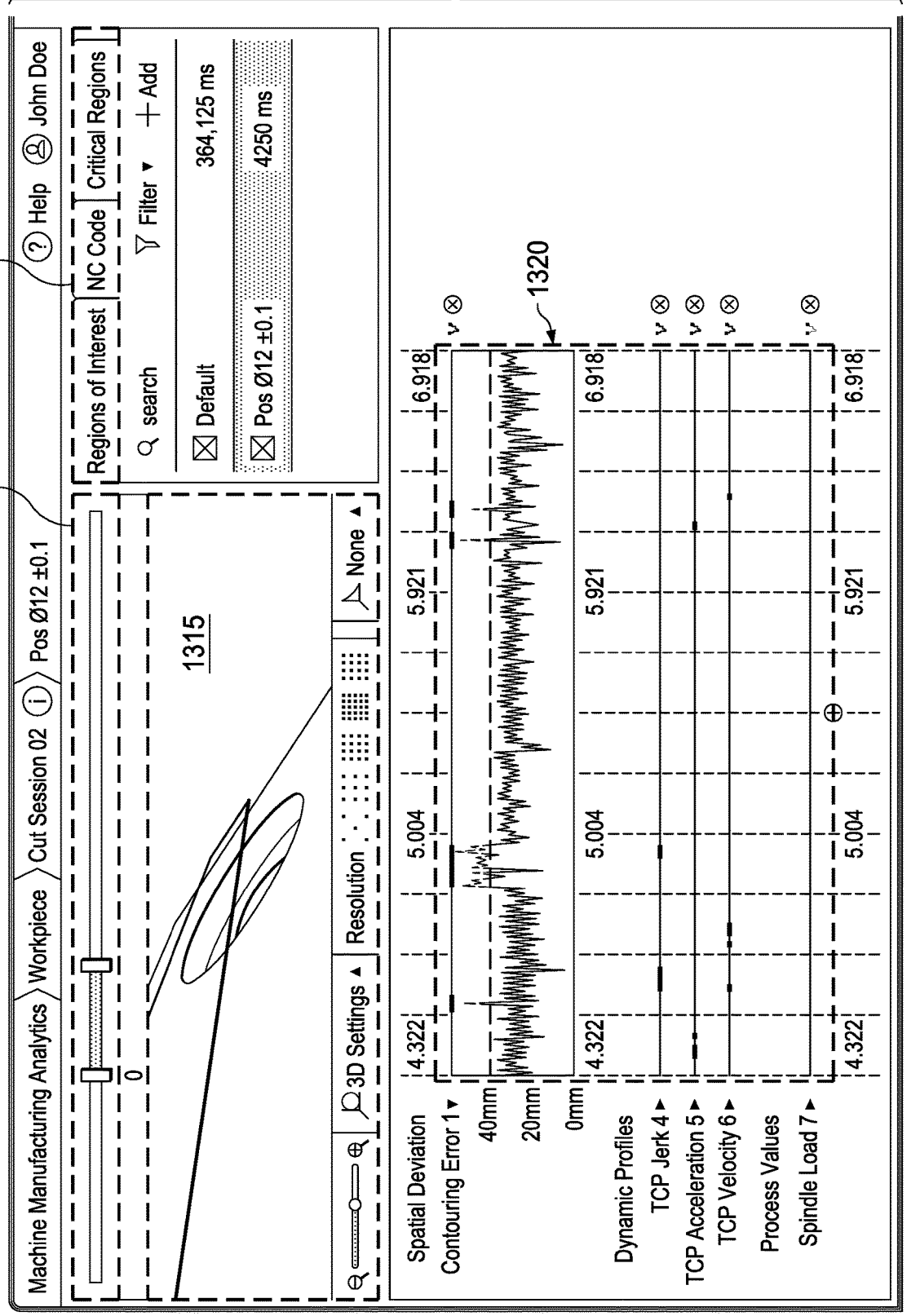

FIGS. 12 (FIGS. 12A-B) and 13 (FIGS. 13A-B) illustrate example interactions provided by the four-way interaction solution described herein. As illustrated in FIG. 12, a UI 1200 includes multiple presentation areas, including a presentation area 1215 for a 3D visualization of a path traveled by a tool or end effector in manufacturing a workpiece, a time slider 1205, a presentation area 1210 associated with the set of instructions executed during a particular manufacturing session, and a presentation area 1220 associated with one or more 2D presentations of evaluated metrics. Each of the presentation areas and time slider 1205 represent or provide UI controls that can be manipulated by a user to select a particular range or set of data within a particular one of the presentation areas. The various presentations are associated via a common underlying connection or reference between the machine-related data set, wherein each of the presentation areas present a view upon that common data set. When a particular one of the areas is modified (e.g., by a selection of a range, by a selection of particular instruction or set of instructions, by zooming of a particular chart, etc.), an operation is automatically performed to identify the reference points (e.g., times, spatial locations, distances traveled during the manufacturing process, etc.) associated with the selection. Those reference points are then identified in or mapped to the other presentation areas and their associated data views, with those presentations being updated to match or correspond to the reference points identified after the UI interaction in the first presentation area.

FIG. 13 shows the updated UI 1300 and presentation areas after a reduced range of time is selected via the time slider 1205. The updated time slider 1305 shows the revised time range as selected during a UI interaction. The presentation area 1315 presents the 3D visualization of the path associated with the selected time range (and zoomed in to show the operations of that time period more clearly), while the presentation area 1320 presents the illustrated 2D metric during the time period specified. Similarly, the presentation area 1310 associated with the set of instructions presents the portions of the instructions specifically executed or otherwise associated with the selected time range. Additionally, in this instance, a set of critical regions occurring within the time range are presented.

FIGS. 14A-14D illustrate example visualizations and interactions provided by the pattern-based benchmarking solution described herein. In the illustration, the 2D metric presentation area is included within its own UI 1400. In some instances, the operations and interactions illustrated may be provided within a UI similar to the previously illustrated UIs, such as UI 1000, 1200, 1300, where the multiple presentation areas are provided. Alternatively, such as when users are investigating differences between different sessions, the 2D metric presentation area may be provided alone in a UI (e.g., UI 1400), or may be made more prominent within one of the other UIs.

Figure 14A:
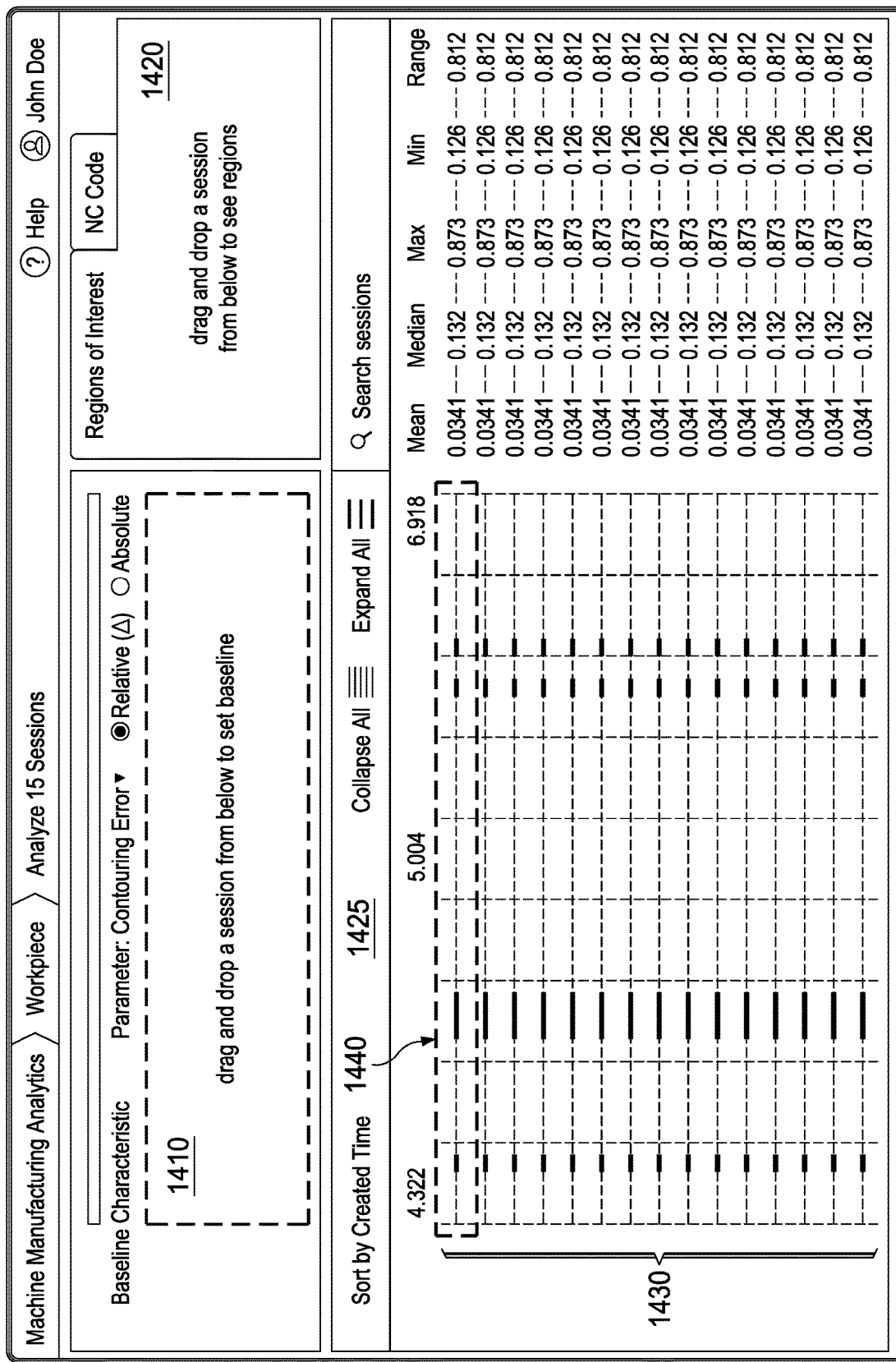
FIGS. 14A-14D illustrate example visualizations and interactions provided by the pattern-based benchmarking solution.

In FIG. 14A, a user can initially be presented with a presentation that includes a baseline session presentation area 1410, a region of interest/instruction area 1420, and a session area 1425. A plurality of sessions 1430 (or at least two) may be presented in association with a particular manufacturing process, where the plurality of sessions 1430 are monitored executions at the same machine at different times, at the same and/or different machines using a similar manufacturing process at the same or different times, or at the same and/or different machines using one or more different manufacturing processes at the same or different times. Each of the sessions may be selectable control allowing interaction with and/or selection of the particular session. In the illustrated example, a drag-and-drop interaction may be used by users to select a particular session as a baseline session for evaluation purposes. Any other suitable interactions may be used to select a particular session as the baseline session, including double-clicking or tapping actions, voice-activated selections, text input, and others. Here, the single session 1440 may be initially determined to be the first baseline session to be used. In some instances, a particular session may be automatically selected (e.g., based on fewest critical regions, previous indication as baseline session, etc.), or the particular session considered a baseline session may be combined, averaged, or otherwise calculated session based on some or all of the plurality of sessions 1430 (or other suitable sessions outside of the plurality of sessions 1430).

Figure 14B:
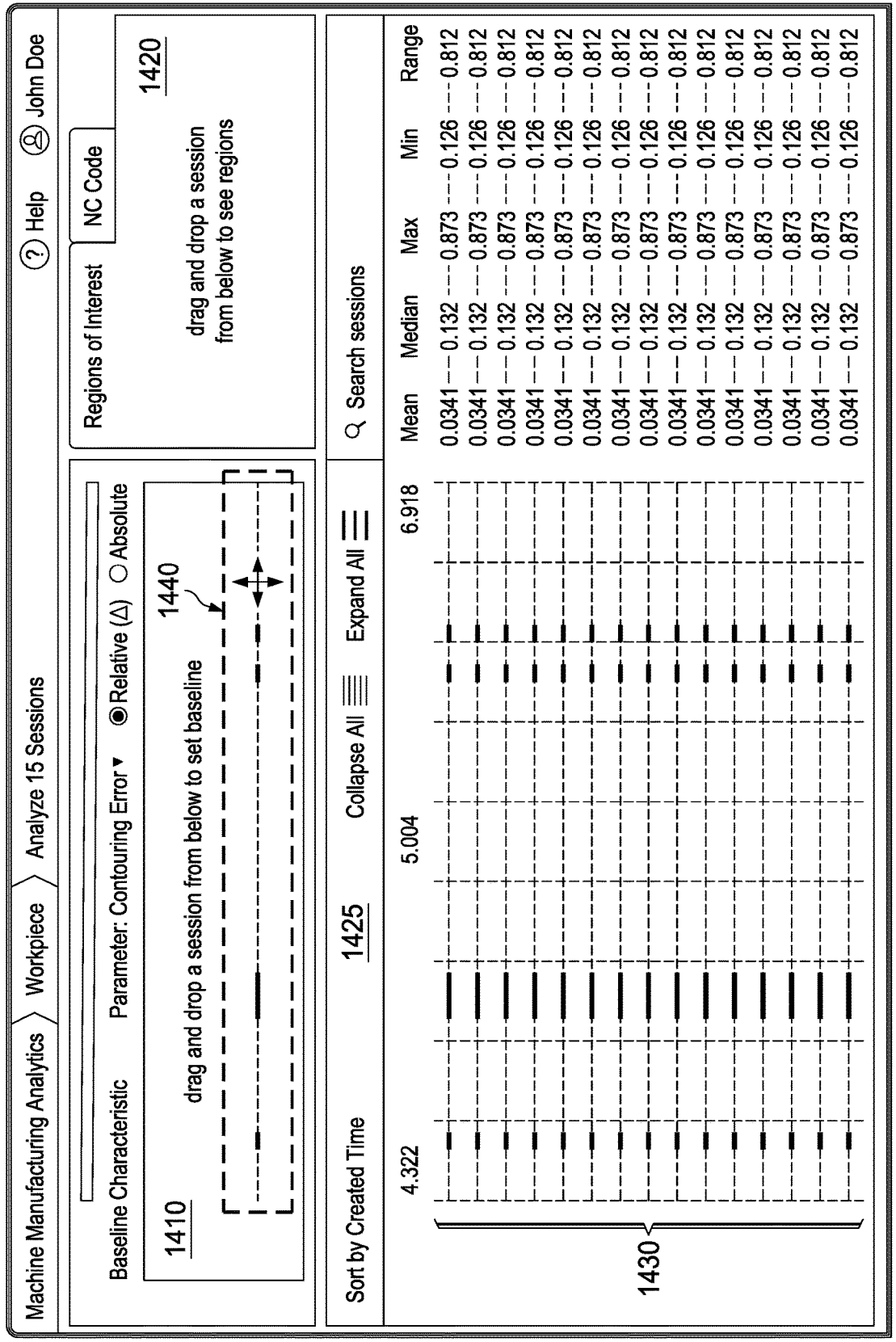

FIG. 14B illustrates the particular session 1440 being dragged-and-dropped into the baseline session presentation area 1410. An illustration of the selected session 1440 may be retained within the session area 1425 or it may be visually removed.

Figure 14C:
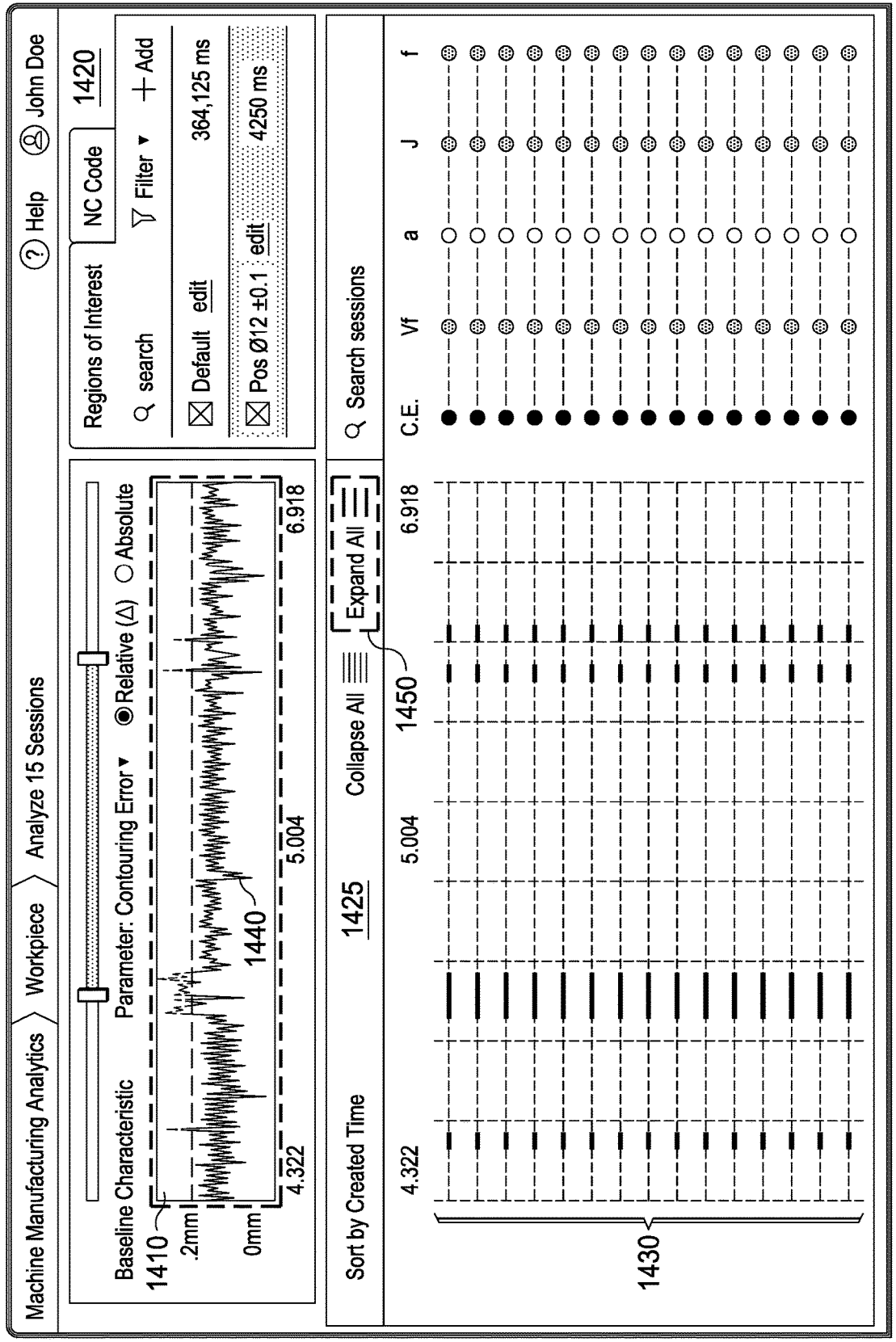
Figure 14D:
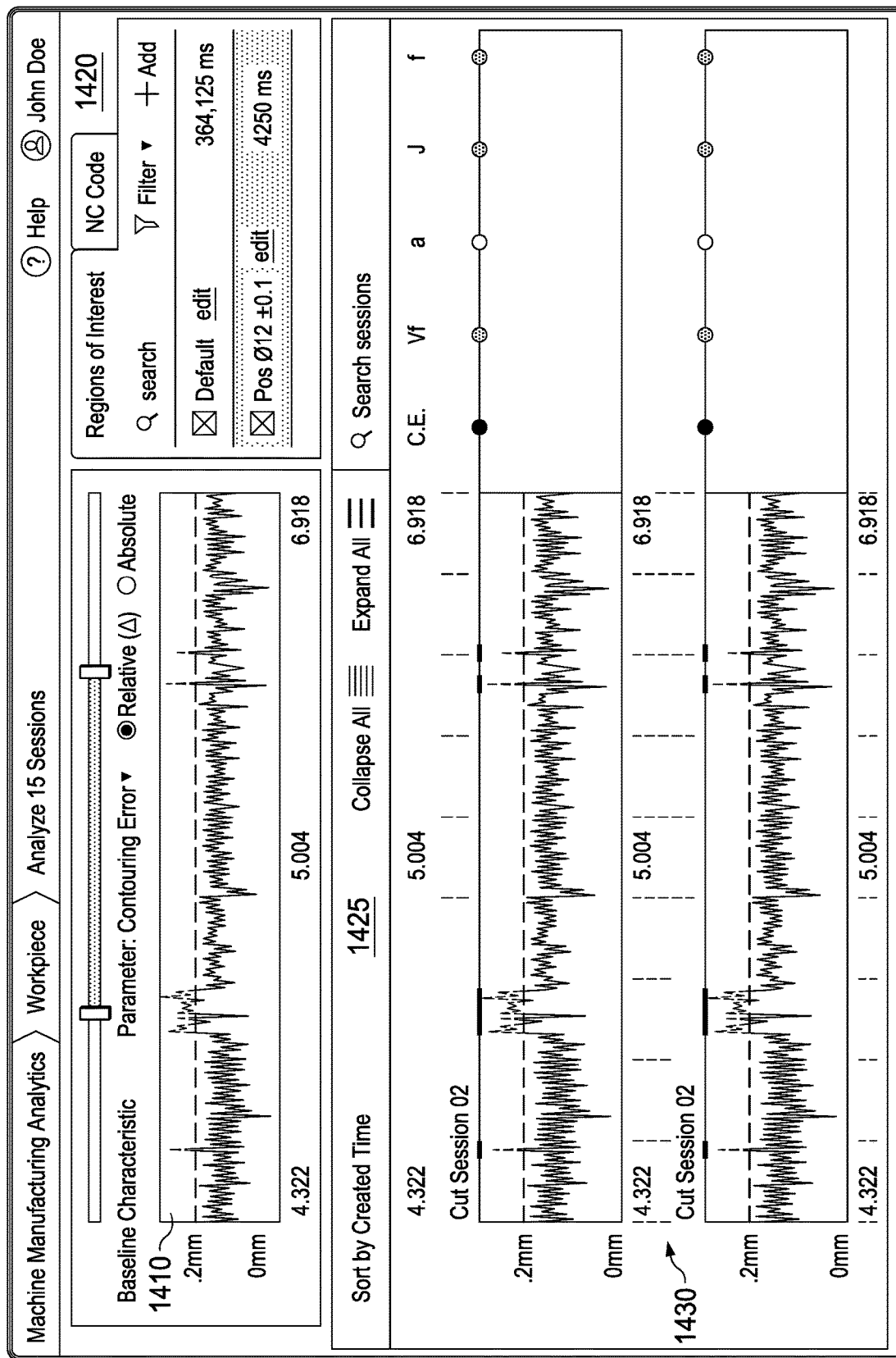

FIG. 14C illustrates UI 1400 after the selection is complete. As illustrated, a detailed view of the selected session 1440 can be presented in the baseline session presentation area 1410. In addition, additional detail about the selected session 1440 may be presented in the optional region of interest/instruction area 1420. The presentation associated with each of the plurality of sessions 1430 may be updated based on characteristics of the selected baseline session. For example, the other sessions 1430 may be normalized to a size or distance traveled of the baseline session 1440, where a compressing or expanding of the presentation may occur. A control 1450 for expanding the plurality of session 1430 and providing detailed views of the metric is presented. A similar control for collapsing sessions is also provided. In some instances, interactions with individual session of the plurality of sessions 1430 can result in a single session being expanded/collapsed at the user's instruction. FIG. 14D provides an illustration of the expanded sessions, and can allow users to compare the metrics over time between the baseline session 1440 and the one or more sessions 1430.

The illustrated interactions present a single iteration of the pattern-based benchmarking process. Multiple iterations may be performed by selecting (e.g., dragging-and-dropping) a different session into the baseline session presentation area 1410, which may be performed at any suitable time. The remaining sessions can be re-evaluated in response and presented in the session area 1425 for further analysis.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The preceding figures and accompanying description illustrate example processes and computer implementable techniques. But environment (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method performed by at least one processor executing instructions, the method comprising:
   presenting a three-dimensional (3D) visualization of machine-related data from a manufacturing process session for manufacturing a particular workpiece, the manufacturing process performed by a machine operating in 3D, the machine-related data associated with a path traveled by a tool or end-effector associated with the machine and/or the machine itself during the manufacturing process session;
   providing at least one two-dimensional (2D) metric data set representing a metric associated with manufacturing process session;
   receiving a selection of a particular one of the at least one provided 2D metric data sets for presentation within the presented 3D visualization of the machine-related data, wherein the selected 2D metric data set comprises a metric associated with the operations of the tool or end-effector associated with the machine and/or the machine itself during the manufacturing process session;
   in response to receiving the selection, determining a connection between values of the selected 2D metric data set and the 3D visualization of the machine-related data, wherein the 3D visualization illustrates the path traveled by the tool or end-effector; and
   incorporating the selected 2D metric data set into the 3D visualization of the machine-related data based on the determined connection between the values of the selected 2D metric data set and the 3D visualization of the machine-related data, wherein incorporating the selected 2D metric data set into the 3D visualization of the machine-related data comprises presenting the selected 2D metric data set on the 3D visualization and highlighting one or more portions of the selected 2D metric data set along at least a section of the path traveled by the tool or end-effector presented on the 3D visualization, wherein highlighting the one or more portions of the selected 2D metric data set along at least the section of the path traveled by the tool or end-effector presented on the 3D visualization further comprises:
   identifying at least one critical region of the selected 2D metric data set as corresponding to at least one value of the selected 2D metric data set that exceeds a defined threshold value; and
   highlighting the at least one critical region on the one or more portions of the selected 2D metric data set to show where the at least one critical region is on the one or more portions of the selected 2D metric data set along at least the section of the path traveled by the tool or end-effector.

2. The method of claim 1, wherein the selected 2D metric data set further comprises a metric value evaluated over a period of time during the manufacturing process session.

3. The method of claim 2, wherein determining the connection between the values of the selected 2D metric data set to the machine-related data of the 3D visualization comprises connecting the metric values of particular times from the selected 2D metric data set to the visualizations of the machine-related data at the corresponding particular times.

4. The method of claim 1, wherein the selected 2D metric data set further comprises a metric value evaluated over a distance traveled during the manufacturing process session.

5. The method of claim 4, wherein determining the connection between the values of the selected 2D metric data set to the machine-related data of the 3D visualization comprises connecting the metric values associated with particular distances traveled to the visualizations of the machine-related data at the corresponding distances traveled.

6. The method of claim 1, wherein the machine-related data in the 3D visualization comprises machine-related data defining an actual path taken by a tool or end-effector associated with the machine and/or the machine itself during the manufacturing process session.

7. The method of claim 1, wherein the machine-related data in the 3D visualization comprises machine-related data defining a path expected to be taken by the path taken by a tool or end-effector associated with the machine and/or the machine itself based on a set of movement instructions provided to the machine during the manufacturing process session.

8. The method of claim 1, wherein the selected 2D metric data set further comprises a calculated parameter derived from one or more measured parameters captured during the manufacturing process session.

9. The method of claim 1, wherein a 3D computer-aided design (CAD) visualization of the workpiece is presented in connection with the 3D visualization of the machine-related data, wherein the selected 2D metric data set is presented on the 3D visualization at an angle based on an orientation relative to presented workpiece.

10. The method of claim 9, wherein in response to a rotation of the workpiece the presentation of the selected 2D metric data set incorporated in the 3D visualization is rotated in connection with the rotation of the workpiece.

11. The method of claim 1, wherein at least a portion of the selected 2D metric data set, when incorporated into the 3D visualization, is presented in a reduced scale.

12. The method of claim 1, wherein the 3D visualization is presented in a first presentation area in a user interface, and wherein, at least prior to selection, the at least one 2D metric data set is presented in a second presentation area in the user interface separate from the first presentation area, and wherein providing the at least one two-dimensional (2D) metric data set representing the metric associated with manufacturing process session is after completion of the manufacturing process session.

13. The method of claim 1, wherein highlighting one or more portions of the selected 2D metric data set presented on the 3D visualization further comprises highlighting at least two portions of the selected 2D metric data set presented on the 3D visualization.

14. A system comprising:
at least one processor; and
a memory communicatively coupled to the at least one processor, the memory storing instructions which, when executed, cause the at least one processor to perform operations comprising:
presenting a three-dimensional (3D) visualization of machine-related data from a manufacturing process session for manufacturing a particular workpiece, the manufacturing process performed by a machine operating in 3D, the machine-related data associated with a path traveled by a tool or end-effector associated with the machine and/or the machine itself during the manufacturing process session;
providing at least one two-dimensional (2D) metric data set representing a metric associated with manufacturing process session;
receiving a selection of a particular one of the at least one provided 2D metric data sets for presentation within the presented 3D visualization of the machine-related data, wherein the selected 2D metric data set comprises a metric associated with the operations of the tool or end-effector associated with the machine and/or the machine itself during the manufacturing process session;
in response to receiving the selection, determining a connection between values of the selected 2D metric data set and the 3D visualization of the machine-related data, wherein the 3D visualization illustrates the path traveled by the tool or end-effector; and
incorporating the selected 2D metric data set into the 3D visualization of the machine-related data based on the determined connection between the values of the selected 2D metric data set and the 3D visualization of the machine-related data, wherein incorporating the selected 2D metric data set into the 3D visualization of the machine-related data comprises presenting the selected 2D metric data set on the 3D visualization and highlighting one or more portions of the selected 2D metric data set along at least a section of the path traveled by the tool or end-effector presented on the 3D visualization, wherein highlighting the one or more portions of the selected 2D metric data set along at least the section of the path traveled by the tool or end-effector presented on the 3D visualization further comprises:
identifying at least one critical region of the selected 2D metric data set as corresponding to at least one value of the selected 2D metric data set that exceeds a defined threshold value; and
highlighting the at least one critical region on the one or more portions of the selected 2D metric data set to show where the at least one critical region is on the one or more portions of the selected 2D metric data set along at least the section of the path traveled by the tool or end-effector.

15. The system of claim 14, wherein the selected 2D metric data set further comprises a metric value evaluated over a period of time during the manufacturing process session, and wherein determining the connection between the values of the selected 2D metric data set to the machine-related data of the 3D visualization comprises connecting the metric values of particular times from the selected 2D metric data set to the visualizations of the machine-related data at the corresponding particular times.

16. The system of claim 14, wherein the selected 2D metric data set further comprises a metric value evaluated over a distance traveled during the manufacturing process session, and wherein determining the connection between the values of the selected 2D metric data set to the machine-related data of the 3D visualization comprises connecting the metric values associated with particular distances traveled to the visualizations of the machine-related data at the corresponding distances traveled.

17. The system of claim 14, wherein the machine-related data in the 3D visualization comprises machine-related data defining an actual path taken by a tool or end-effector associated with the machine and/or the machine itself during the manufacturing process session.

18. The system of claim 14, wherein the selected 2D metric data set further comprises a calculated parameter derived from one or more measured parameters captured during the manufacturing process session.

19. A non-transitory computer-readable medium storing instructions which, when executed, cause at least one processor to perform operations comprising:

presenting a three-dimensional (3D) visualization of machine-related data from a manufacturing process session for manufacturing a particular workpiece, the manufacturing process performed by a machine operating in 3D, the machine-related data associated with a path traveled by a tool or end-effector associated with the machine and/or the machine itself during the manufacturing process session;

providing at least one two-dimensional (2D) metric data set representing a metric associated with manufacturing process session;

receiving a selection of a particular one of the at least one provided 2D metric data sets for presentation within the presented 3D visualization of the machine-related data, wherein the selected 2D metric data set comprises a metric associated with the operations of the tool or end-effector associated with the machine and/or the machine itself during the manufacturing process session;

in response to receiving the selection, determining a connection between values of the selected 2D metric data set and the 3D visualization of the machine-related data, wherein the 3D visualization illustrates the path traveled by the tool or end-effector; and incorporating the selected 2D metric data set into the 3D visualization of the machine-related data based on the determined connection between the values of the selected 2D metric data set and the 3D visualization of the machine-related data, wherein incorporating the selected 2D metric data set into the 3D visualization of the machine-related data comprises presenting the selected 2D metric data set on the 3D visualization and highlighting one or more portions of the selected 2D metric data set along at least a section of the path traveled by the tool or end-effector presented on the 3D visualization, wherein highlighting the one or more portions of the selected 2D metric data set along at least the section of the path traveled by the tool or end-effector presented on the 3D visualization further comprises:

identifying at least one critical region of the selected 2D metric data set as corresponding to at least one value of the selected 2D metric data set that exceeds a defined threshold value; and highlighting the at least one critical region on the one or more portions of the selected 2D metric data set to show where the at leas t one critical region is on the one or more portions of the selected 2D metric data set along at least the section of the path traveled by the tool or end-effector.

\* \* \* \* \*